United States Patent [19]
Kosugi et al.

[11] Patent Number: 5,523,900
[45] Date of Patent: Jun. 4, 1996

[54] HEAD POSITION DETECTING METHOD AND APPARATUS

[75] Inventors: Tatsuhiko Kosugi; Shuichi Hashimoto; Toru Shinohara, all of Kawasaki, Japan

[73] Assignee: Fujitsu Limited, Japan

[21] Appl. No.: 194,663

[22] Filed: Feb. 8, 1994

[30] Foreign Application Priority Data

Feb. 19, 1993 [JP] Japan ................................ 5-054977

[51] Int. Cl.⁶ .................................................. G11B 5/596
[52] U.S. Cl. .................................. 360/77.05; 360/78.14; 360/51
[58] Field of Search ........................... 360/78.14, 78.04, 360/77.02, 77.05, 77.07, 77.11, 51

[56] References Cited

U.S. PATENT DOCUMENTS

| | | | |
|---|---|---|---|
| 4,549,232 | 10/1985 | Axmear et al. | 360/77.07 |
| 4,642,562 | 2/1987 | Collins et al. | 360/77.08 X |
| 5,262,907 | 11/1993 | Duffy et al. | 360/78.14 X |

*Primary Examiner*—Aristotelis Psitos
*Assistant Examiner*—James L. Habermehl
*Attorney, Agent, or Firm*—Greer, Burns & Crain, Ltd.

[57] ABSTRACT

A head position detecting method and apparatus for detecting a phase difference from servo data on a recording medium to detect the position of a head. This head position detecting method and apparatus detect the phase differences between the read pulse of the servo data read by the head and reference clocks, and average the phase differences to detect the head position. A training area having a timing signal recorded therein is provided before the servo data on the recording medium. A phase-lock loop circuit for generating reference clocks is synchronized with the timing signal to accurately detect the phase differences. An integrator is used to average the phase differences. This design ensures accurate detection of the head position even under fast seek. Further, a phase difference signal around a target cylinder is obtained by selecting the phase of the reference clock in accordance with the position of the target cylinder.

25 Claims, 26 Drawing Sheets

FIG. 3
(PRIOR ART)
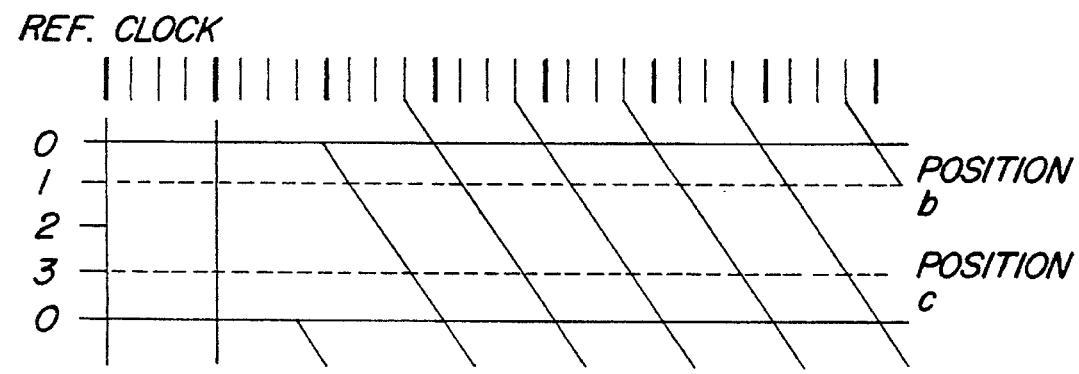
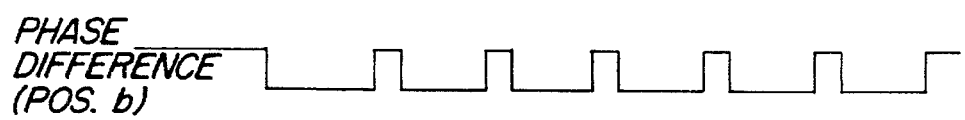
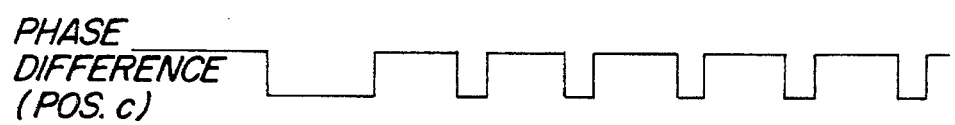
FIG. 4
(PRIOR ART)
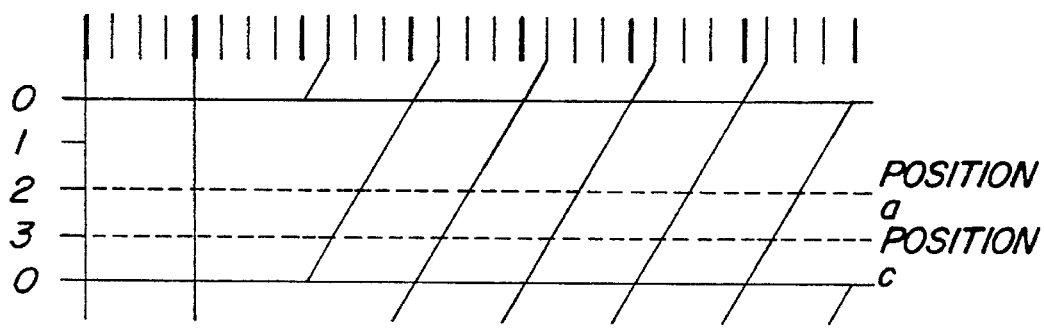
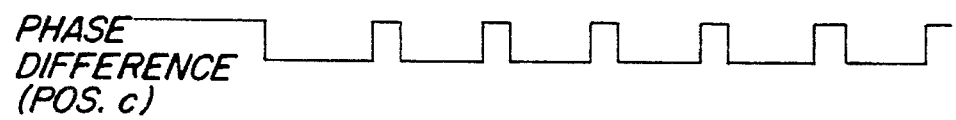

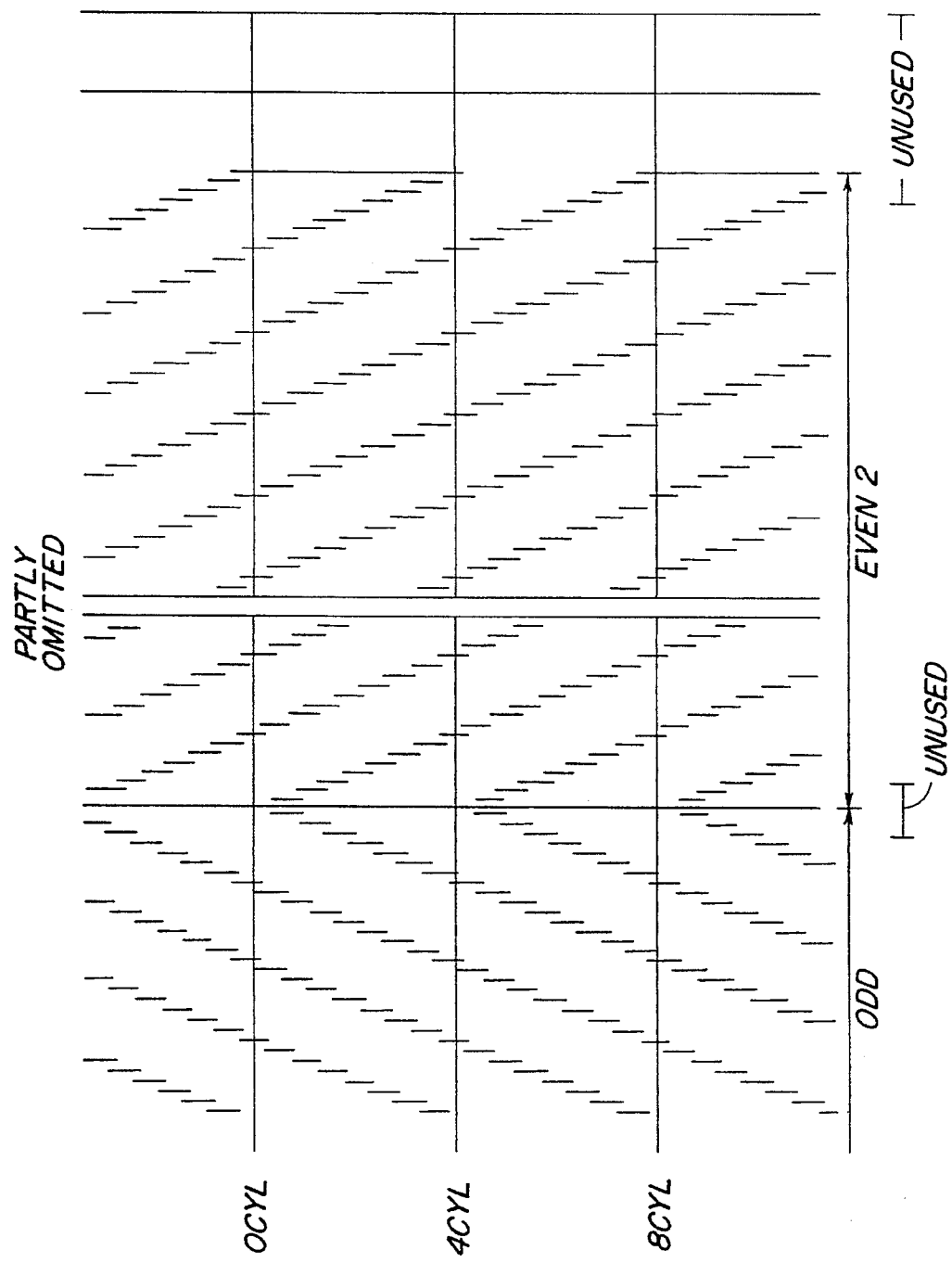

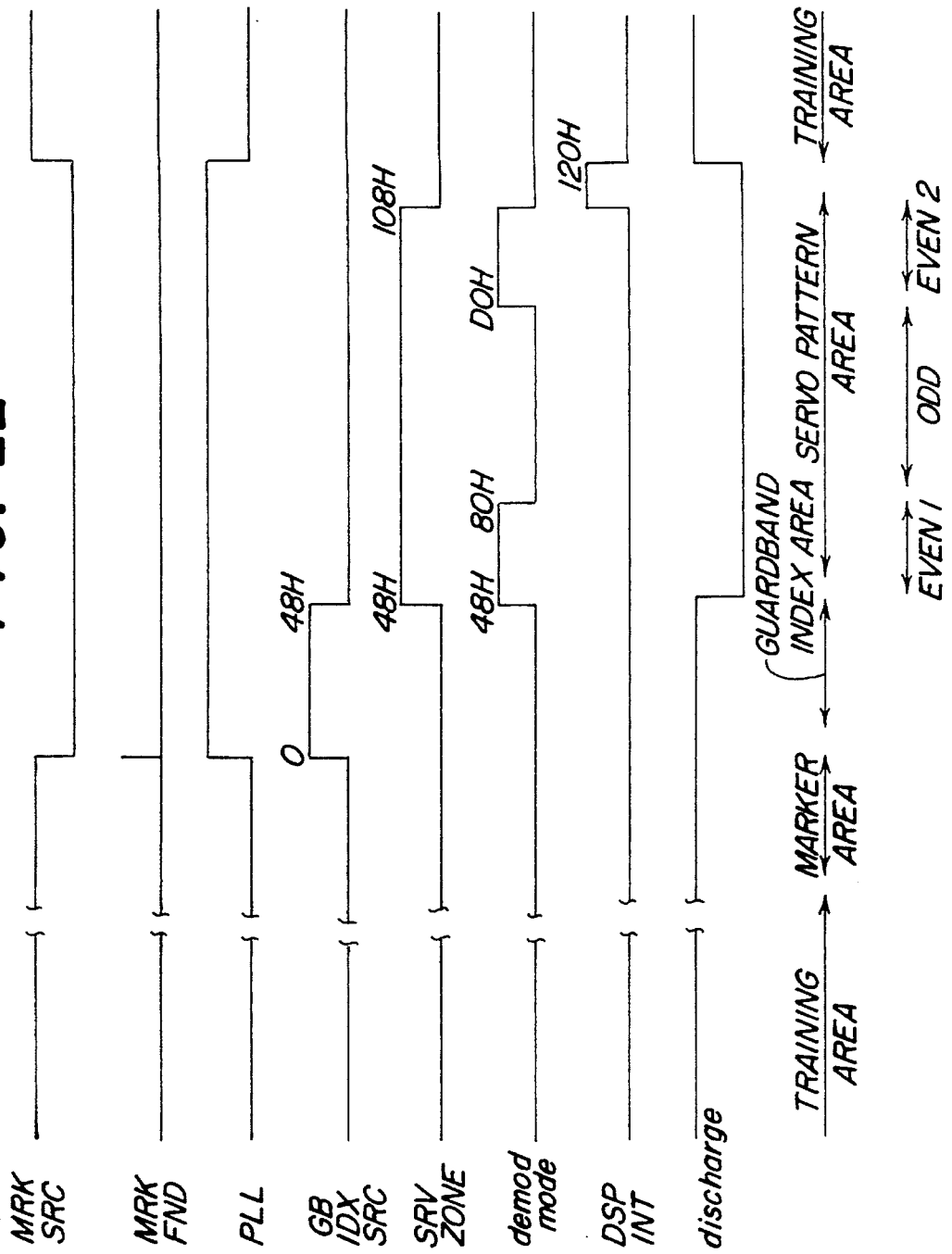

FIG. 24A
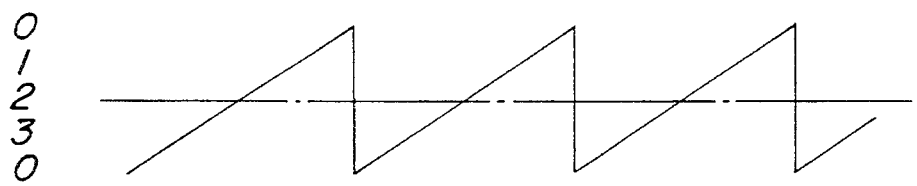
FIG. 24B
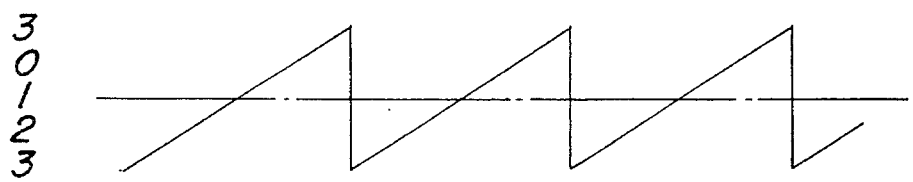
FIG. 24C
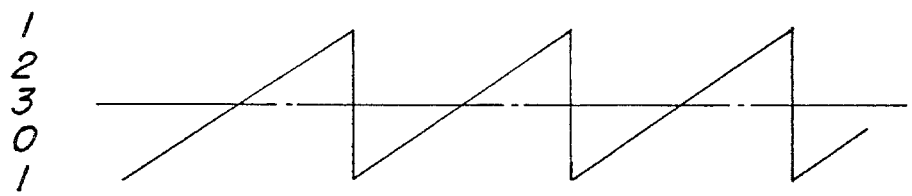
FIG. 25
|        | EVEN 1, 2   | ODD         |
|--------|-------------|-------------|
| CYL. 0 | PLL-CK4-D0  | PLL-CK4-D0  |
| CYL. 1 | PLL-CK4-D3  | PLL-CK4-D1  |
| CYL. 2 | PLL-CK4-D2  | PLL-CK4-D2  |
| CYL. 3 | PLL-CK4-D1  | PLL-CK4-D3  |

HEAD POSITION DETECTING METHOD AND APPARATUS

BACKGROUND OF THE INVENTION

1. Field of the Invention

The present invention relates to a head position detecting method and apparatus for detecting the position of a head from servo data recorded on a recording medium, and, more particularly, to a head position detecting method and apparatus for detecting the position of a head from the phase of servo data.

2. Description of the Related Art

Magnetic disk apparatuses move a magnetic head in the radial direction of a rotating magnetic disk to position it on a target track, and read or write data from or on the magnetic disk. To improve the memory capacity and make the apparatuses compact, it is inevitable to improve the recording density, particularly, the track density. To increase the access speed, the seek time of magnetic heads is demanded to be around 10 milliseconds.

Accordingly, the magnetic head positioning circuit employs a digital circuit using a fast processor. Since the use of this digital servo circuit makes it sufficient to detect the head position only at the sample timing, the servo head position detector is also demanded to have a performance different from that of an analog servo position detector.

In general, a typical two-phase servo pattern is designed in such a way that as TPI (track density) of a magnetic disk increases the band of the position demodulator increases, thus making the servo pattern susceptible to noise. According to this two-phase servo pattern, the peaks of the waveform recorded on the servo surface of the magnetic disk are detected, and the head position is detected from the detected peaks. While the peaks are successively obtained in this system, noise and a variation in level on the surface of the magnetic disk directly influence the amount of position detection.

As a solution to this problem, a system, which uses a phase type servo pattern and detects the head position from a phase difference, has been proposed in U.S. Pat. Nos. 4,549,232 and 4,642,562 (corresponding Japanese Unexamined Patent Publication No. 10472/1985).

According to the phase type servo pattern, as shown in FIG. 1, servo patterns with different phases are recorded in the circumferential direction of individual cylinders 0, 1, 2, ... of a magnetic disk. The illustrated phase pattern has a first field EVEN1 and a third field EVEN2, with a second field ODD of the opposite phase provided therebetween. This pattern allows the position of a moving magnetic head to be read at the center of the second field.

The principle of this type phase position detection will be explained with reference to FIGS. 2 through 4. In FIGS. 2 to 4, the phase pattern is designed to form one cycle by four reference clocks. It is therefore possible to detect the head position in four cylinders 0 to 3. The reference phase of the reference clock is indicated by the thick solid lines in the diagrams. As shown in FIG. 2, when the magnetic head is at the position a (cylinder 2), the phase difference between the reference phase and the phase of the read pulse of the servo pattern becomes ½ of one cycle.

When the magnetic head is at the position b (cylinder 1), as shown in FIG. 3, the phase difference between the reference phase and the phase of the read pulse of the servo pattern becomes ¼ of one cycle. Likewise, when the magnetic head is at the position c (cylinder 2), the phase difference between the reference phase and the phase of the read pulse of the servo pattern becomes ¾ of one cycle. Further, when the magnetic head is at the cylinder 0, the phase difference between the reference phase and the phase of the read pulse of the servo pattern becomes zero or one cycle.

While the above is an example for the fields EVEN1 and EVEN2 of the servo pattern, the phase difference is similarly found for the field ODD of the opposite phase. When the magnetic head is at the position a (cylinder 2), as shown in FIG. 4, the phase difference between the reference phase and the phase of the read pulse of the servo pattern becomes ½ of one cycle. It is therefore possible to detect in which one of the cylinders 0 to 3 the magnetic head is positioned by detecting this phase difference.

According to this phase system, after the peaks of the waveform recorded on the servo surface are detected, the phase comparison between the peak pulse and the reference clock is performed a plurality of times and the average phase difference is obtained to be a position signal. As the phase comparison should be executed a plurality of times, signals will not be obtained consecutively. Because of the averaging, however, the detection of the head position is not easily affected by noise. Further, if a level change on the surface of the magnetic disk is on such a degree as not to cause a variation in peak detection, accurate position detection is possible. Since a digital positioning controller has only to obtain position information sample by sample, consecutive information is not necessary so that the above phase type servo pattern is suitable for the digital positioning controller.

According to the prior art, however, a clock generator of a fixed phase type, such as a crystal oscillator, is used to generate a reference clock. The number of rotations of a magnetic disk varies slightly. In using a reference clock of a fixed phase, therefore, when the rotation of a magnetic disk varies, the phase difference between the reference clock and the servo pattern cannot accurately be detected. This will reduce the precision of the position detection. Further, the oscillation frequency of the crystal oscillator varies with temperature. Because the phase of the reference clock varies with the ambient temperature, the phase difference between the reference clock and the servo pattern cannot accurately be detected. This will also reduce the precision of the position detection.

According to the prior art, after detection of the servo pattern, the phase difference and average phase difference are determined to detect the head position by an exclusive processor. When the seek speed of the magnetic head becomes faster, therefore, the position detecting process by the processor will not match the speed. It is therefore difficult to accomplish a faster seek. If a processor with a fast operation speed is used to accomplish a faster seek, the apparatus inevitably becomes expensive.

In addition, according to the prior art, the phase difference changes from 0 to 1 cycle (four clocks) for four cylinders. As the phase of this reference clock is fixed, the phase difference changes by an amount corresponding to four cylinders in accordance with the head position around the center cylinder (cylinder 2 in FIGS. 2 to 4). Accordingly, while there is a consecutive variation width for four clocks around this center cylinder, the variation width is small for the other cylinders (e.g., cylinders 0, 1 and 3). It is therefore difficult to detect the head position in those other cylinders under coarse control, making on-track control difficult.

SUMMARY OF THE INVENTION

It is therefore an object of the present invention to provide a head position detecting method and apparatus for accurately detecting a phase difference between a reference clock and servo pattern.

It is another object of this invention to provide a head position detecting method and apparatus which will output a position signal corresponding to the phase difference in real time even under fast seek.

It is a further object of this invention to provide a head position detecting method and apparatus which will ensure easy on-track control over the entire cylinders.

To achieve those objects, according to one aspect of this invention, there is provided a method for detecting a head position by reading servo data from a recording medium having a plurality of tracks, said servo data being recorded on each track and including at least a timing pattern and position pattern having different phases between the adjacent tracks, the method comprising the steps of reproducing a timing signal and position signal corresponding to the timing pattern and position pattern, generating reference clocks; synchronizing the reference clocks with the timing signal; generating a phase difference signal indicating a phase difference between the position signal and the synchronized reference clock; and generating a head position signal from the phase difference signal.

According to this aspect of this invention, there is provided an apparatus for detecting a head position by reading servo data from a recording medium having a plurality of tracks, the servo data being recorded on said each track and including at least a timing pattern and position pattern having different phases between the adjacent tracks, the apparatus comprising the recording disk on which a training area having the timing pattern recorded therein is provided before a servo area having the position pattern recorded therein; a phase-lock loop circuit for generating reference clocks in synchronous phase with the timing pattern read by the head; a phase difference detector for outputting a phase difference signal indicating a phase difference between each of the reference clocks and a read pulse of the servo pattern read by the head; and a position signal generator for generating a head position signal indicating the position of the head from the phase difference signal from the phase difference detector.

According to this aspect, the phase-lock loop circuit as a clock generator is phase-synchronized by the training area provided before the servo area on the recording disk. Accordingly, a reference clock synchronized with the servo pattern on the recording disk is generated. It is therefore possible to generate a reference clock of a specified phase, regardless of the variation in the rotation of the recording disk or the variation in ambient temperature. This design will ensure correct phase comparison with the servo pattern, thereby accomplishing correct detection of the head position based on the phase difference.

According to another aspect of this invention, there is provided a method for detecting a head position by reading servo data from a recording medium having a plurality of tracks, the servo data being recorded on each track and including at least portion position pattern having difference phases between the adjacent tracks, the method comprising the steps of reproducing a servo signal from said servo data; generating a phase difference signal indicating a phase difference between a read pulse of the servo signal and a reference clock generated by a clock generator; and integrating a phase difference signal to generate a head position signal indicating the position of the head by an integrator.

According to the second aspect of this invention, there is provided an apparatus for detecting a head position by reading servo data from a recording medium having a plurality of tracks the servo data being recorded on each track and including at least a position pattern having different phases between the adjacent tracks, the apparatus comprising a clock generator for generating a reference clock; a phase difference detector for generating a phase difference signal corresponding to a phase difference between the reference clock and a read pulse of the servo data; an integrator for integrating the phase difference signal from the phase difference detector to generate a head position signal indicating the position of the head; and an analog-to-digital converter for converting an output of the integrator into a digital value.

According to the second aspect, the circuit for averaging phase differences to prepare a position signal comprises an integrator for generating a head position signal indicating the position of the head, and an analog-to-digital converter for converting the output of the integrator into a digital value, so that the averaged phase difference can be obtained through an integrating operation. This design will permit quick production of a position signal by averaging the phase differences and realize this circuit with a simple structure.

According to a further aspect of this invention, there is provided a method for detecting a head position by reading servo data from a recording medium having a plurality of tracks, the servo data being recorded on each track and including at least a position pattern having different phases between the adjacent tracks, comprising the step of reproducing a servo signal from the servo data; generating a plurality of reference clocks of different phases corresponding to the tracks; selecting a reference clock which corresponds to a target track, from among the plurality of reference clocks; generating a phase difference signal indicating a phase difference between a read pulse of the servo signal and the selected reference clock; and generating a head position signal indicating the position of the head from the phase difference signal.

According to this aspect of this invention, there is provided an apparatus for detecting a head position by reading servo data from a recording medium having a plurality of track, the servo data being recorded on said each track and including at least a position pattern having different phases between the adjacent tracks, the apparatus comprising a clock generator for generating reference clocks of a plurality of different phases corresponding to the tracks; a track selector for selecting that reference clock which corresponds to a target track from among the plurality of reference clocks of different phases; a phase difference detector for generating a phase difference signal corresponding to a phase difference between the selected reference clock and a read pulse of the servo data; and a position signal generator for generating a head position signal indicating the position of the head from the phase difference signal from the phase difference detector.

According to the third aspect, since the reference clock is selected in accordance with the target cylinder, it is possible to obtain a position signal which allows the target cylinder to be the center cylinder. This design will facilitate on-track control.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

FIG. 3 is an explanatory diagram for explaining an operation for conventional prior art position detection of a phase type;

FIG. 4 is a diagram for also explaining the conventional prior art position detection of a phase type;

FIG. 12 is an explanatory diagram (No. 2) of the servo area shown in FIG. 7;

FIG. 21A is an explanatory diagram of a reference clock;

FIG. 22 is a time chart for the position signal generator shown in FIG. 16;

FIGS. 24A, 24B and 24C are diagrams for explaining the cylinder selecting operation;

FIG. 25 is a diagram showing the relation between the target cylinder and the reference clock;

DETAILED DESCRIPTION OF THE PREFERRED EMBODIMENT

Figure 5:
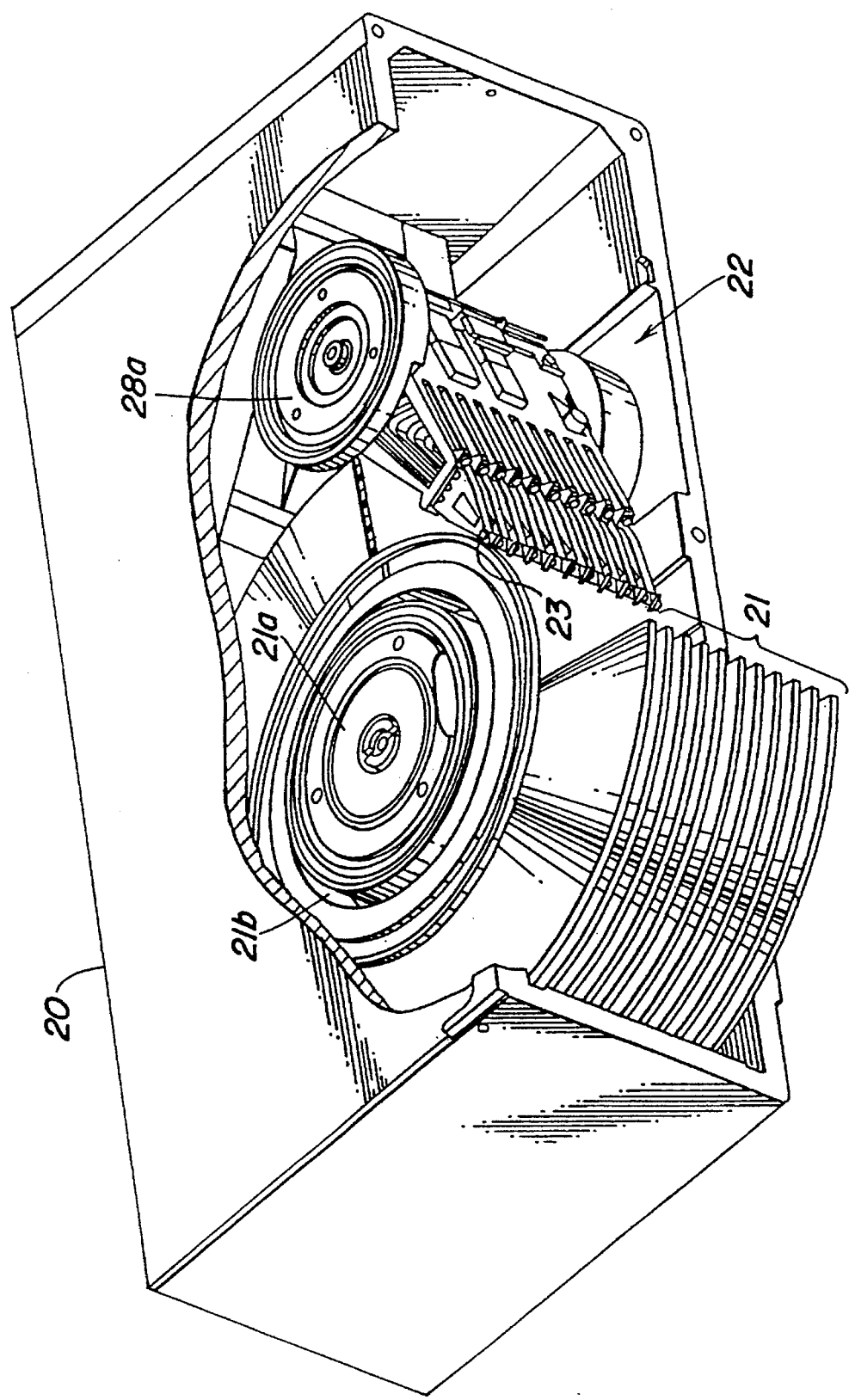
FIG. 5 is a perspective view of a magnetic disk apparatus to which this invention is applied.
Figure 6:
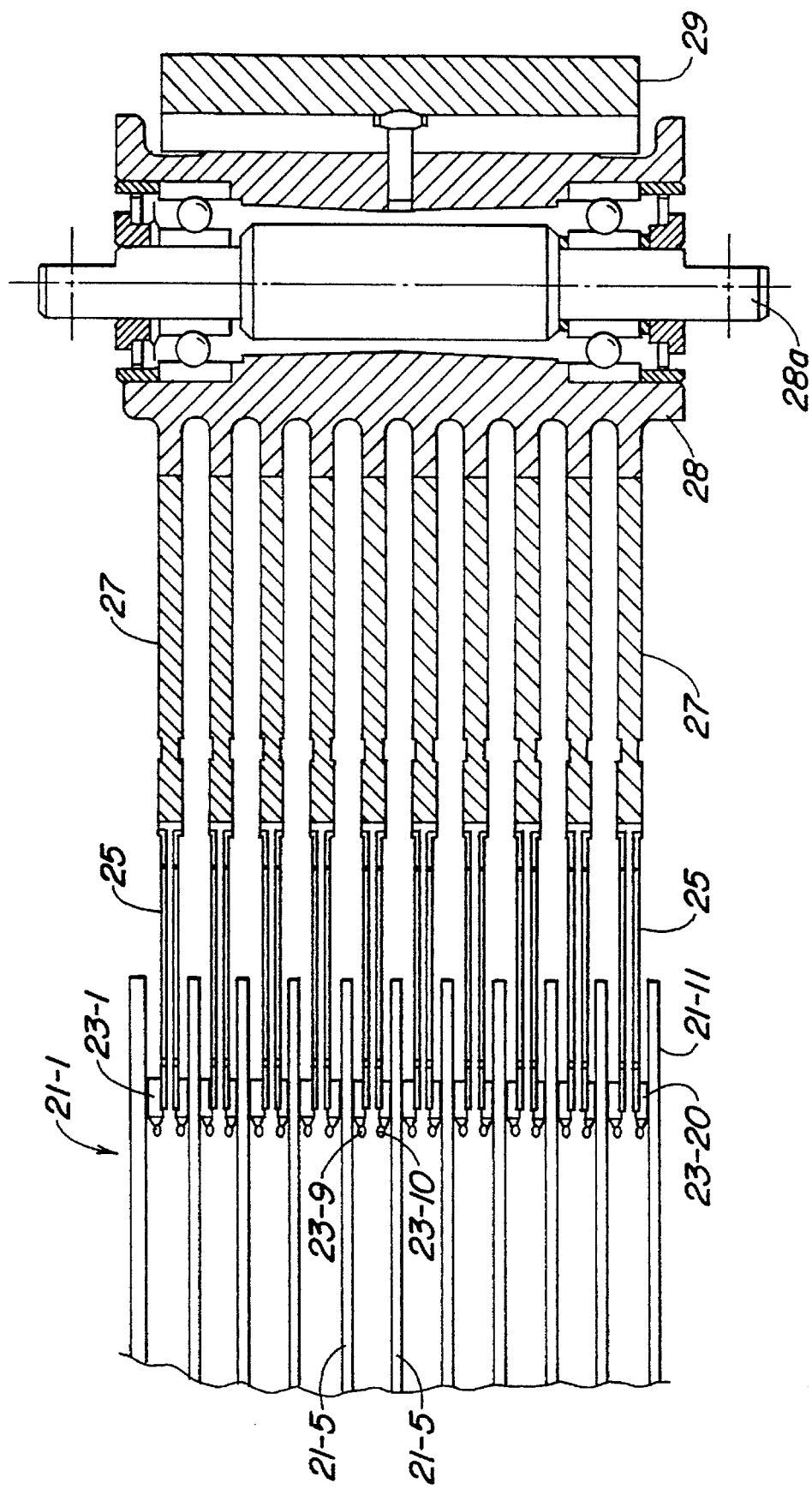
FIG. 6 is a structural diagram of a head actuator shown in FIG. 5.

FIG. 5 presents a perspective view of a magnetic disk apparatus according to one embodiment of the present invention, and FIG. 6 presents a structural diagram of a head actuator shown in FIG. 5.

In FIG. 5 showing the structure of a magnetic disk apparatus, reference numeral "20" denotes the case of the magnetic disk apparatus, which is made of metal such as aluminum and securely supports the rotational center shafts of a magnetic disk 21 and a head actuator 22, which will be described later. The magnetic disk 21 has a diameter of 5.25 inches. This magnetic disk 21 is secured to a motor hub 21b which is designed rotatable to its rotational center shaft 21a via a bearing. As the motor hub 21b is rotated by a coil provided on the rotational center shaft 21a, the magnetic disk 21 rotates. The head actuator 22 has a magnetic head 23 at its distal end, and rotates around a rotational center shaft 28a to move the magnetic head 23 in the radial direction of the magnetic disk 21, as will be described later with reference to FIG. 6.

In the structure of the head actuator shown in FIG. 6, the magnetic disk 21 has eleven magnetic disks 21-1 to 21-11 placed one on another at given intervals within a predetermined apparatus height (form factor). In FIG. 6, reference numeral "28" is a block which is rotatable via a bearing to a fixed shaft (rotational center shaft) 28a which has both ends supported by the apparatus case 20. A coil 29 is provided at the rear end of the block 28, and constitutes a rotary VCM together with a magnetic circuit (not shown) fixed to the apparatus. The coil 29 rotates the block 28 around the fixed shaft 28a. Ten arms 27 are integrally provided on the block 28, protruding therefrom.

Spring arms 25 are each constituted of a leaf spring made of stainless steel, and are secured to to top and bottom of each arm 27 to support the associated magnetic head 23. The magnetic disk 23 is constituted by attaching a thin film head to the back portion of a slider, and is provided on the spring arm 25 via a gimbal (not shown).

In this embodiment, the servo surface having a servo signal recorded thereon is provided on the top surface of the magnetic disk 21-6 at the center of the eleven magnetic disks 21-1 to 21-11. The magnetic head facing this magnetic disk is the servo head 23-10, which reads a servo signal pattern from the servo surface on the magnetic disk 21-6. As the servo surface is provided at the center one of the magnetic disks 21-1 to 21-11 in this manner, the distances from the servo surface to the magnetic disks 21-1 to 21-11 which are located farthest from the servo surface are shortened. If the block 28 and the arms 27 are deformed due to thermal deformation to tilt the shaft of the block 28, therefore, the amount of offset can be made smaller.

In this embodiment, ten arms 27 and twenty magnetic heads 23 are provided for eleven magnetic disks 21-1 to 21-11. Therefore, the top surface of the magnetic disk 21-1 and the bottom surface of the magnetic disk 21-11 are not used. This is because using that two surfaces requires additional provision of two more arms 27 so that the disk assembly will not fit within the specified apparatus height. Without such a restriction, of course, two more arms 27 may be provided to use the top surface of the magnetic disk 21-1 and the bottom surface of the magnetic disk 21-11.

Figure 7:
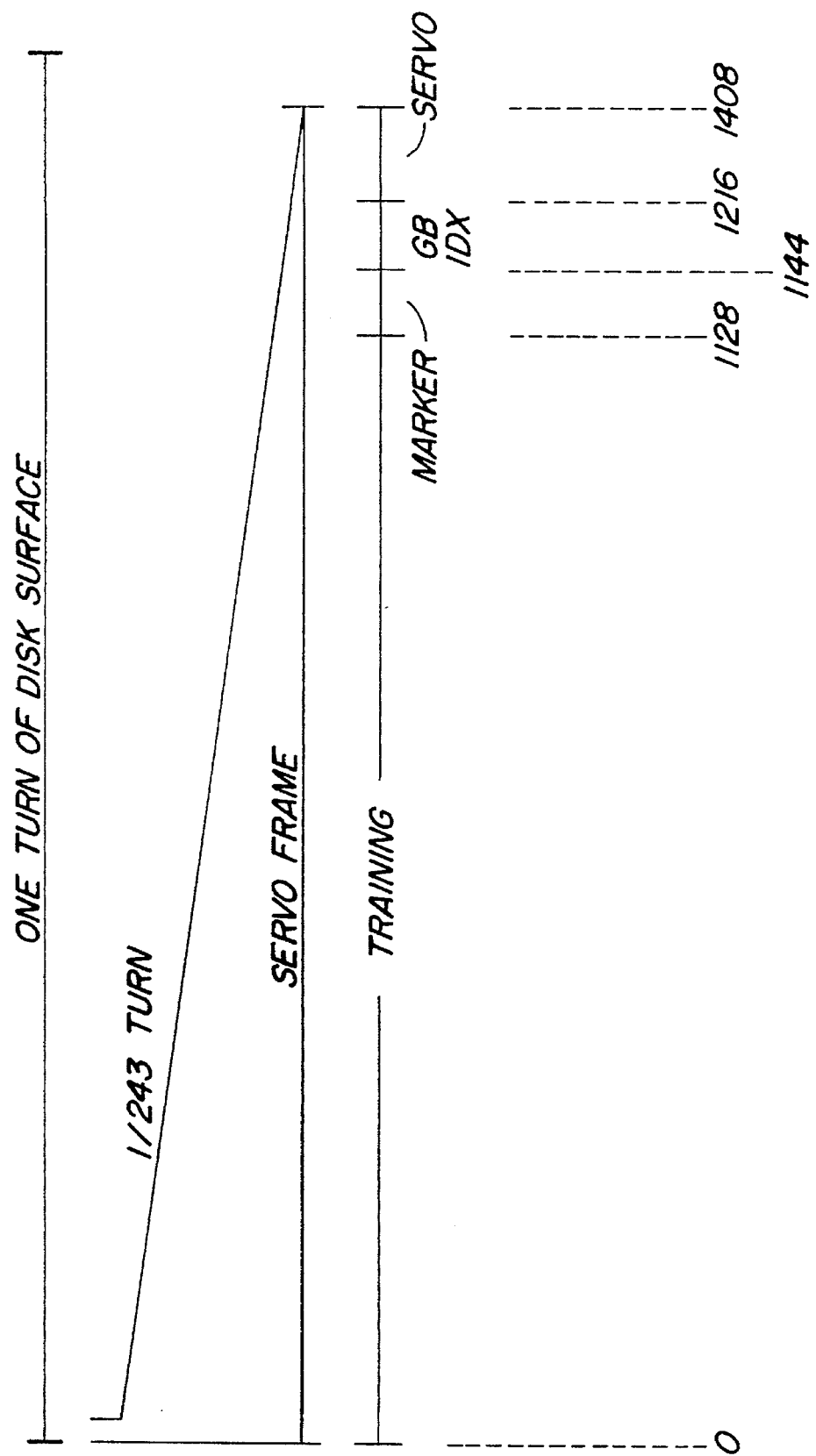
FIG. 7 is an explanatory diagram of a servo frame according to this invention.
Figure 8:
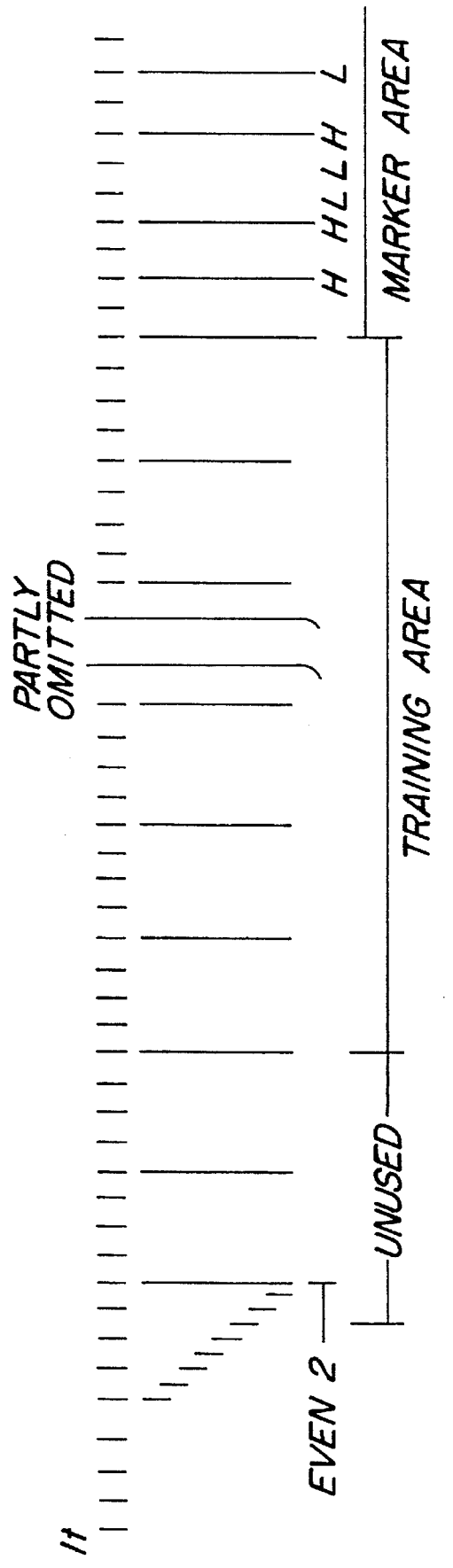
FIG. 8 is an explanatory diagram of a training area shown in FIG. 7.
Figure 9:
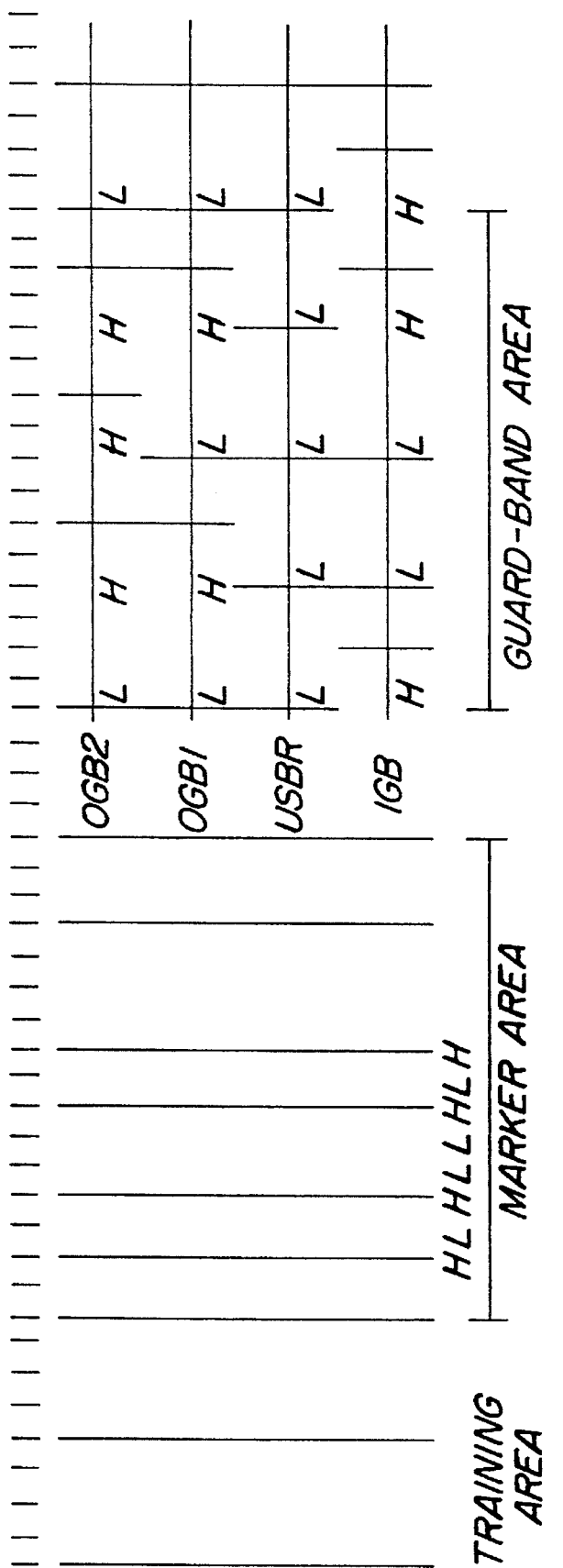
FIG. 9 is an explanatory diagram of a marker area shown in FIG. 7.
Figure 10:
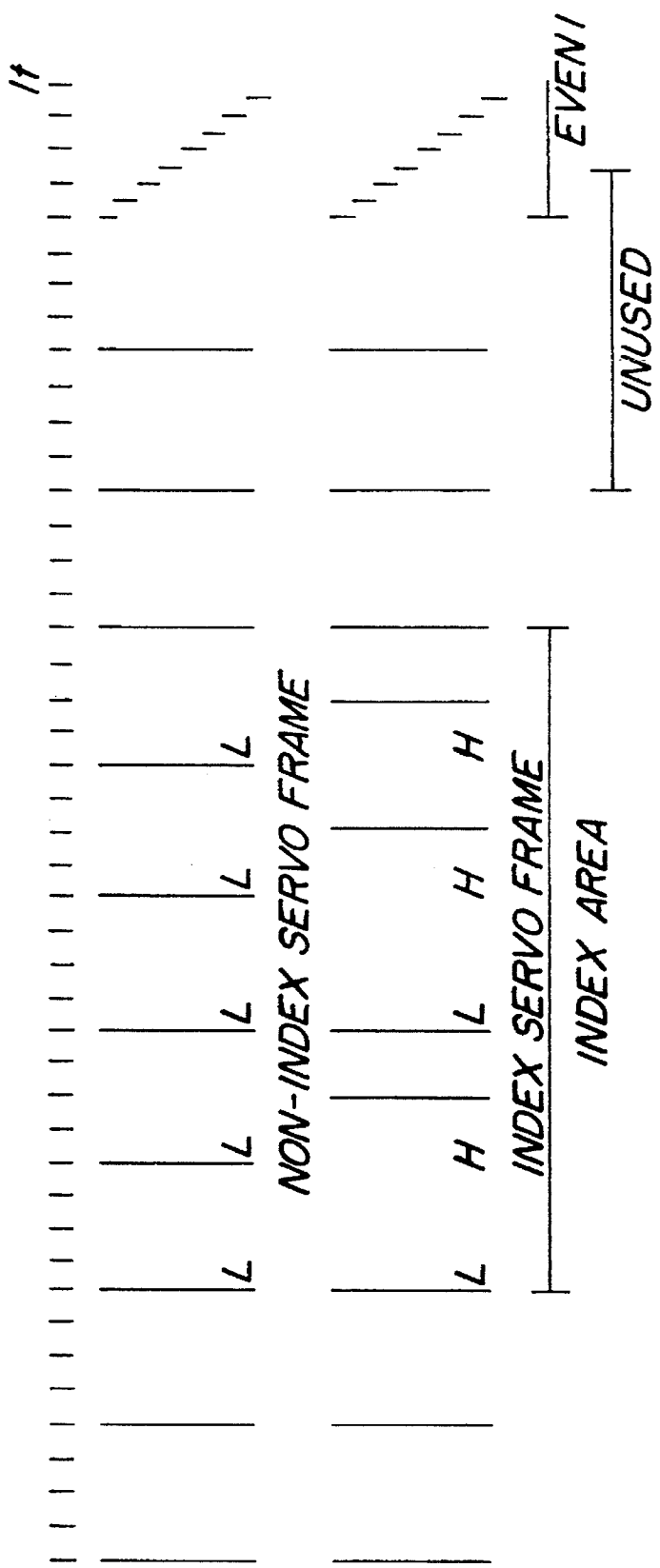
FIG. 10 is an explanatory diagram of an index area shown in FIG. 7.
Figure 11:
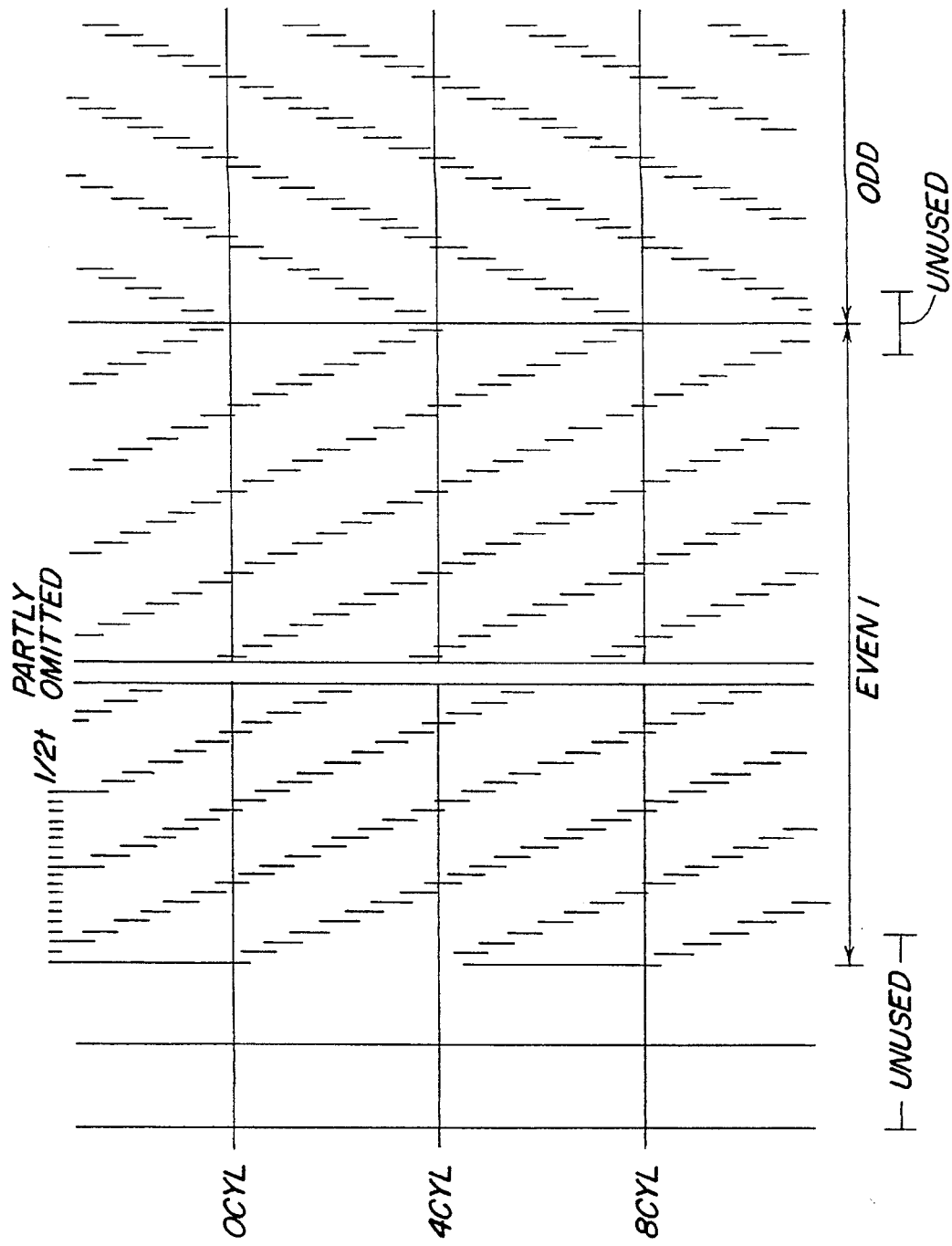
FIG. 11 is an explanatory diagram (No. 1) of a servo area shown in FIG. 7.
Figure 13A:
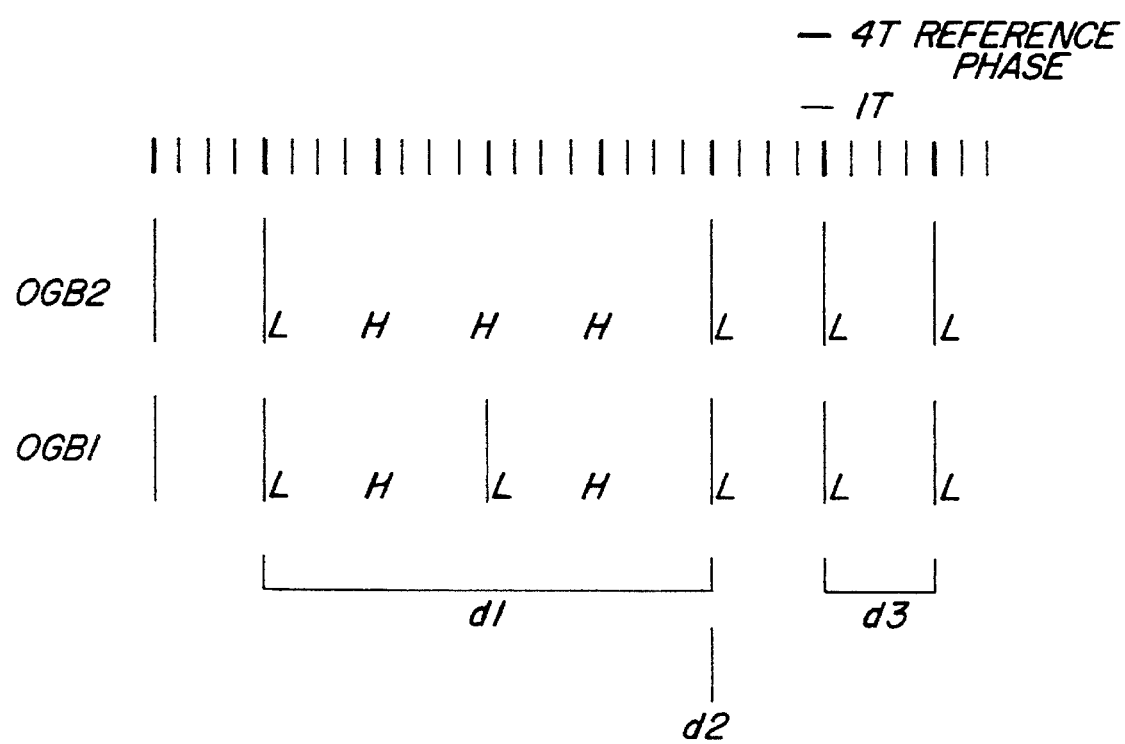
FIG. 13A is an explanatory diagram of a guard band area.
Figure 13B:
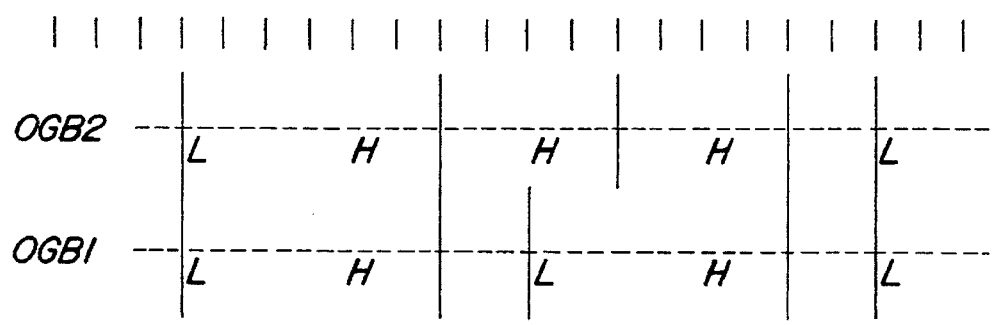
FIG. 13B is an explanatory diagram of the guard band area shown in FIG. 7.

FIG. 7 is an explanatory diagram of a servo frame, FIG. 8 is an explanatory diagram of its training area, FIG. 9 is an explanatory diagram of its marker area, FIG. 10 is an explanatory diagram of its index area, FIGS. 11 and 12 are explanatory diagrams of its servo area, FIG. 13A is an explanatory diagram of its guard band area, and FIG. 13B is a diagram for explaining how to record the guard band area.

Servo data is written on the servo surface on the magnetic disk 21-6 in FIG. 6 at concentric individual cylinder positions. As shown in FIG. 7, this servo data consists of 243 servo frames in one track of the magnetic disk 21. One servo frame consists of a training area, a marker area, a guard band/index area and a servo area (position detecting area).

A training pattern written in the training area serves to synchronize the phase of a PLL (Phase-Lock Loop) circuit to be described later, and to function in the preparation stage for marker detection. As shown in FIG. 8, the training pattern is a timing pattern which shows magnetism inversions indicated by the thick solid line and thin solid line (thick solid line indicating a positive peak and thin solid line indicating a negative peak) in a specific cycle (four-clock cycle) of the reference clock. As shown in FIG. 7, with one servo frame consisting of 1408 clock periods (equivalent to 24.7 MHz for 4340 rpm as the number of rotations of the magnetic disk 21), the training pattern is set to 1128 clock periods.

The marker area serves to secure the position in the servo frame. As shown in FIG. 9, while the servo frame is basically written on the four-clock basis, the marker area is written on both the two-clock basis and three-clock basis. This pattern is employed to prevent erroneous detection of the four-clock based signal when redundancy is given to the detection of the marker area. Even with redundancy given to the marker detection, therefore, the marker area can surely be detected.

The aforementioned PLL circuit oscillates in one clock cycle. When a four-clock cycle is prepared from one clock cycle, therefore, there would be four types of phases. The marker serves to establish one of the phases. As shown in FIG. 9, the positions of magnetism inversion, indicated by thick lines and thin lines as described above, are treated as "H" (high level), and the position of no magnetism inversion is treated as "L" (low level). Therefore, the marker area takes a pattern of "HLHLLHLH" in one clock cycle. The detection of the marker is carried out by detecting a match with a 6-bit pattern of "H HLLH H" which has "L" on both sides removed from the original pattern. The length of the marker area is set to cycles of 16 clocks from 1128 to 1144, as shown in FIG. 7.

Then, the guard band/index area is separated to a guard band area and an index area. The guard band/index area has a length of 4T×(1+5+6+5+1) where 1T is a one-clock cycle. In this area, the first and last one bits and the center 6 bits have no significance.

The first 5 bits are guard band data, which is used to distinguish a user cylinder from a system control area and to position the magnetic head to the zero cylinder first. The portion where the magnetic head comes closest to the center of the recording disk medium is an inner guard band (IGB), the center portion (most portion) of the recording disk medium is a user cylinder, the outer side is an outer guard band 1 (OGB1), and its outer side is an outer guard band 2 (OGB2).

As shown in FIG. 9, those discriminators are indicated by five bits. The user cylinder has a 5-bit pattern of "00000" which has magnetism inversion in an ordinary 4T period. A pattern different from the ordinary pattern is recorded in the outer guard band. This will be described referring to FIGS. 13A and 13B. If guard band data is written on the servo surface in the same format as ordinary data that is written in the data surface on the magnetic disk 21, a problem would arise for the following reason. In the case of the data surface, a gap exists between adjoining cylinders, and it is not probable that the operation of the magnetic head to read data would take place in that gap. If the magnetic head is positioned between adjoining cylinders on the servo surface for an offset or a seek operation, either data should be read out. For instance, with the servo head lying between OGB1 and OGB2, either OGB1 or OGB2 should be detected. In the system of reading/writing data in peak detection, therefore, the presence or absence of magnetism inversion (presence or absence of a pulse in peak detection) is treated as "1" or "0." However, this method will bring about a problem with respect to the servo surface.

FIG. 13A shows a case where OGB1 (pattern LHLHL) and OGB2 (pattern LHHHL) are recorded in the conventional system with the absence of pulse with a reference phase of 4T treated as "1." In this method, as shown d1 in FIG. 13A first, H ("1") occurs three times consecutively in OGB2 so that there is no peak over a period of 16T. Accordingly, erroneous peak detection may occur. Secondly, as shown d2 and d3 in FIG.13A, since the number of H ("1") in OGB1 differs from that in OGB2, the magnetism inversion of the subsequent pattern will have opposite phases between OGB1 and OGB2. In a middle of OGB1 and OGB2, the N pole and S pole cancel out, causing a state where nothing is detected.

To overcome those problems, the positions of magnetism inversion are partially shifted by a reference 4T phase, as shown in FIG. 13B. The above two problems are overcome by setting L ("0") if magnetism inversion occurs at the reference phase 4T, and setting H ("1") if there is no magnetism inversion at this reference phase. In the same manner, the pattern "HLLHH" is also recorded in the inner guard band (IGB).

The second 5 bits in the guard band/index area are index data. As shown in FIG. 10, if it is an index, the pattern "LHLHH" is recorded, and if it is not an index, the pattern "HLLHH" is recorded.

The position detecting area (servo area) is an area for detecting the position of the servo head. As shown in FIGS. 11 and 12, this area has a length of 4T×(2+12+20+12+2). The first two bits and last two bits have no significance. The center three sections, 12, 20 and 12 bits, are the aforementioned EVEN1, ODD and EVEN2. As is known, the position pattern of this area has different phases for the individual cylinders. In this example, the pattern to be written is repeated every four cylinders. Further, phase transition becomes opposite between EVEN1 or EVEN2 and ODD. Furthermore, the lengths of EVEN1 and EVEN2 are set nearly equal to the length of ODD, as described above.

Figure 14:
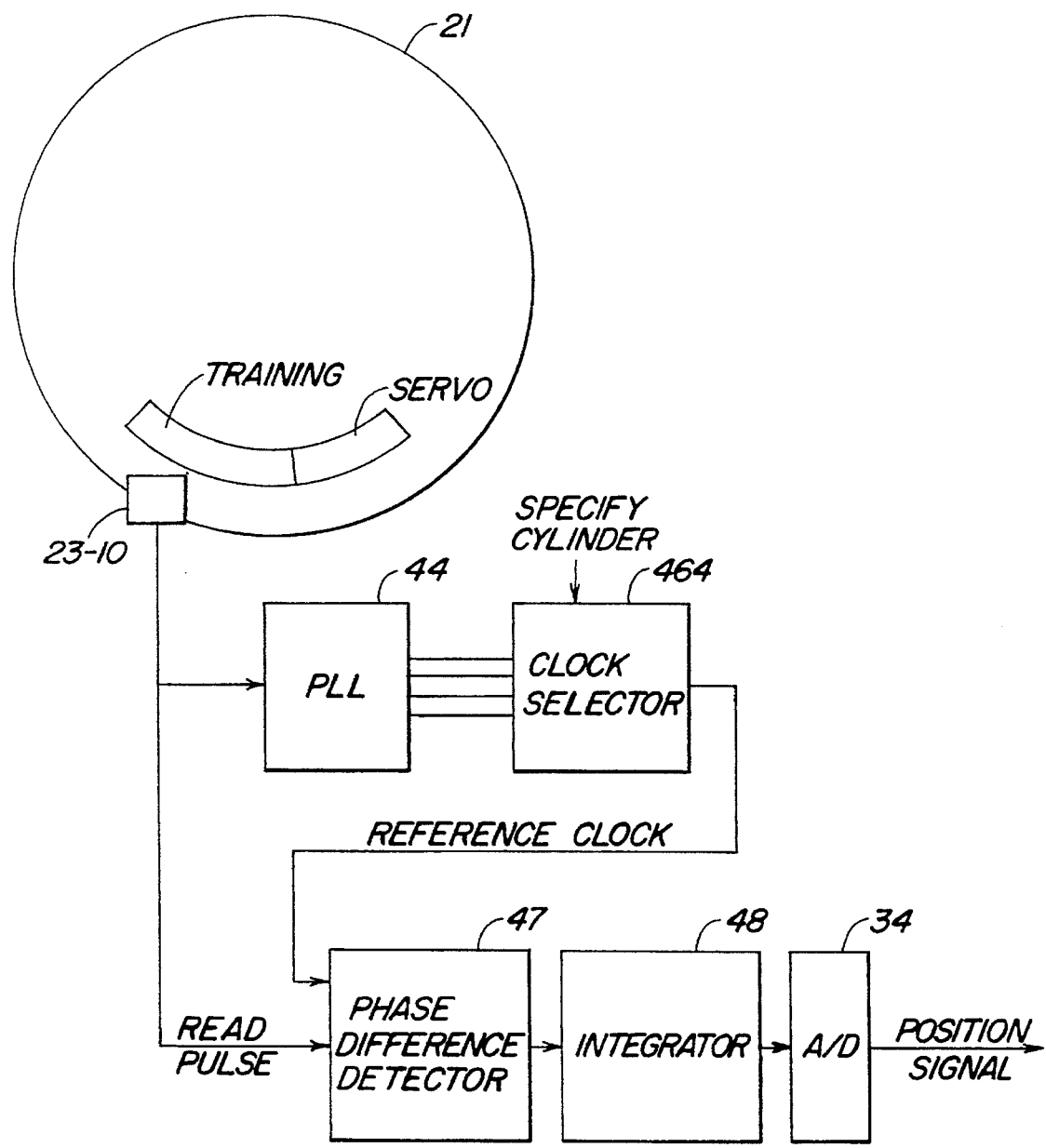
FIG. 14 is a diagram for explaining the principle of this invention.

FIG. 14 shows the principle of the present invention. As shown in FIG. 14, the training area is provided before the servo area on the servo surface on the magnetic disk 21. The data on the servo surface on the magnetic disk 21 is read by the servo head 23-10. What is read from the training area (timing signal) by the servo head 23-10 is input to a PLL circuit 44. The PLL circuit 44 generates a clock of four phases phase-synchronized with the timing signal. A clock selector 464 selects the clock in accordance with the designated target cylinder to generate a reference clock. A phase difference detector 47 outputs a signal indicating the phase difference between the read pulse of the servo data from the servo head 23-10 and the reference clock. The phase difference signal from the phase difference detector 47 is integrated by an integrator 48 to obtain an averaged phase difference. The output voltage (integrated voltage) of the integrator 48 is converted into a digital value by an A/D (Analog-to-Digital) converter 34. This digital value is a position signal.

Figure 15:
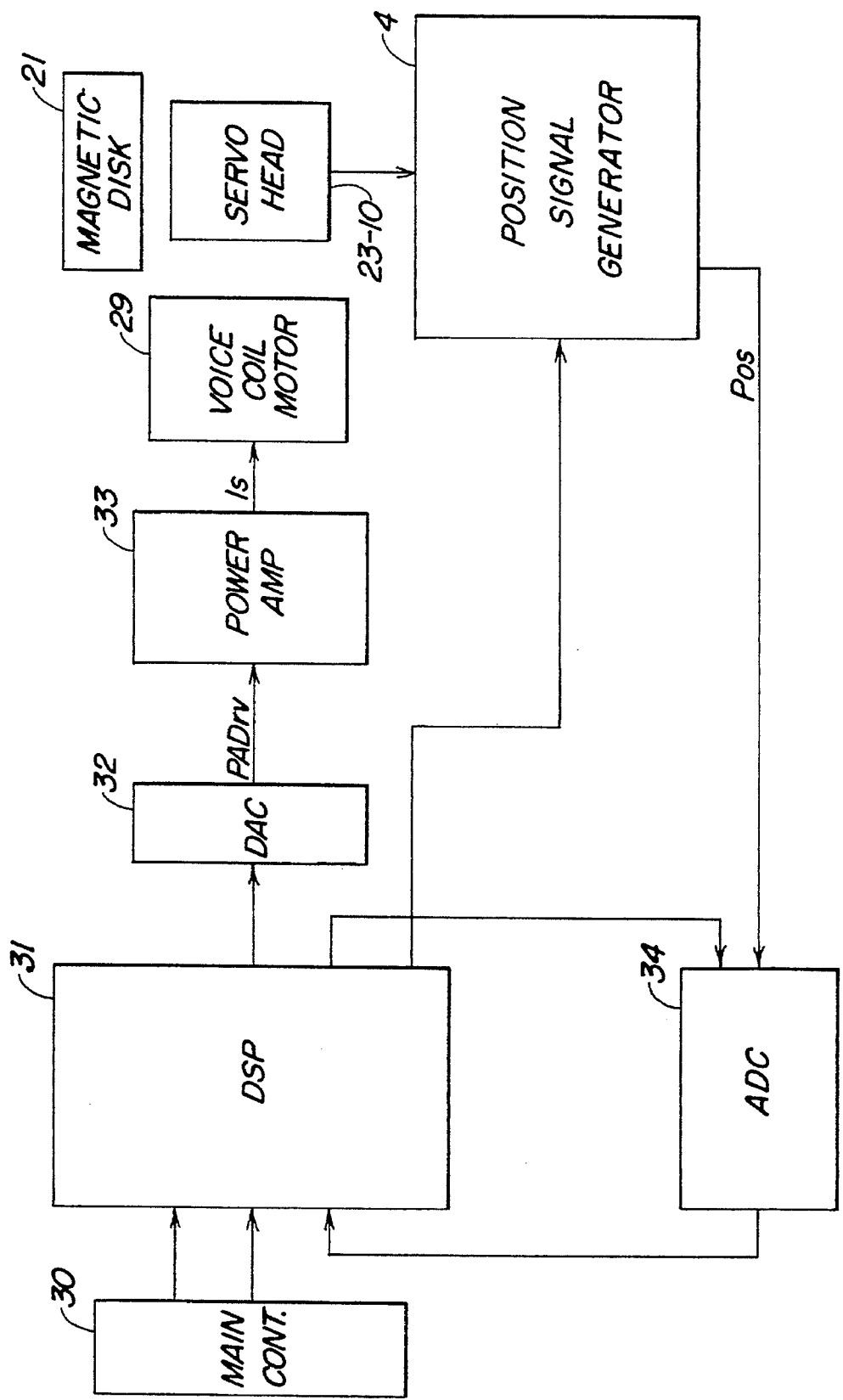
FIG. 15 is a block diagram of a positioning control circuit according to this invention.

FIG. 15 is a block diagram of a positioning control circuit according to one embodiment of this invention. The same reference numerals as used in FIGS. 5, 6 and 14 are used to denote the corresponding or identical components in FIG. 15. A position signal generator 4 detects the phase difference between the read pulse (servo signal) and the reference clock to prepare an analog position signal indicating the phase difference. This position signal generator 4 will be described below with reference to FIG. 13. Reference numeral "30" denotes a main control circuit which executes a read/write command and a seek command from an upper unit, and generates a target position to seek the target and a servo command.

A DSP (Digital Signal Processor) 31 performs coarse control and fine control based on the position signal from the position signal generator 4 to execute on-track control on the magnetic heads 23-1 to 23-20. A D/A (Digital-to-Analog) converter 32 converts the speed control value from the DSP 31 into an analog voltage. A power amplifier 33 converts the analog voltage from the D/A converter 32 into a current and drives a coil 29 of the voice coil motor to move the servo head 23-10 in the radial direction of the magnetic disk 21 for its positioning. The A/D converter 34 converts the analog position signal from the position signal generator 4 into a digital value in response to a conversion instruction from the DSP 31 and inputs the digital value to the DSP 31.

This positioning control circuit executes coarse control without using a track crossing pulse, and this control method is described in the specification of the international application PCT JP91/00870 filed Jun. 27, 1991, entitled "Apparatus and Method of Controlling Head Positioning of Disk Drive," (corresponding U.S. patent application Ser. No. 07/820637).

Briefly, the DSP 31 predicts the position of the servo head at the next sampling under speed control, and computes the actual position based on this predicted position and the position signal which is the output of the A/D converter 34 to thereby perform position control. In other words, the DSP 31 obtains the actual position and computes the next predicted position based on this actual position and the previously-computed actual position. Then, the actual speed is computed from the difference between the current actual position and the previous actual position. Further, the number of remaining tracks is computed from the current actual position, and the target speed is obtained from the number of remaining tracks to compute the current value corresponding to the difference between the actual speed and the target speed. This current value is output to the D/A converter 32 to drive the voice coil motor 29 by means of the power amplifier 33.

Figure 16:
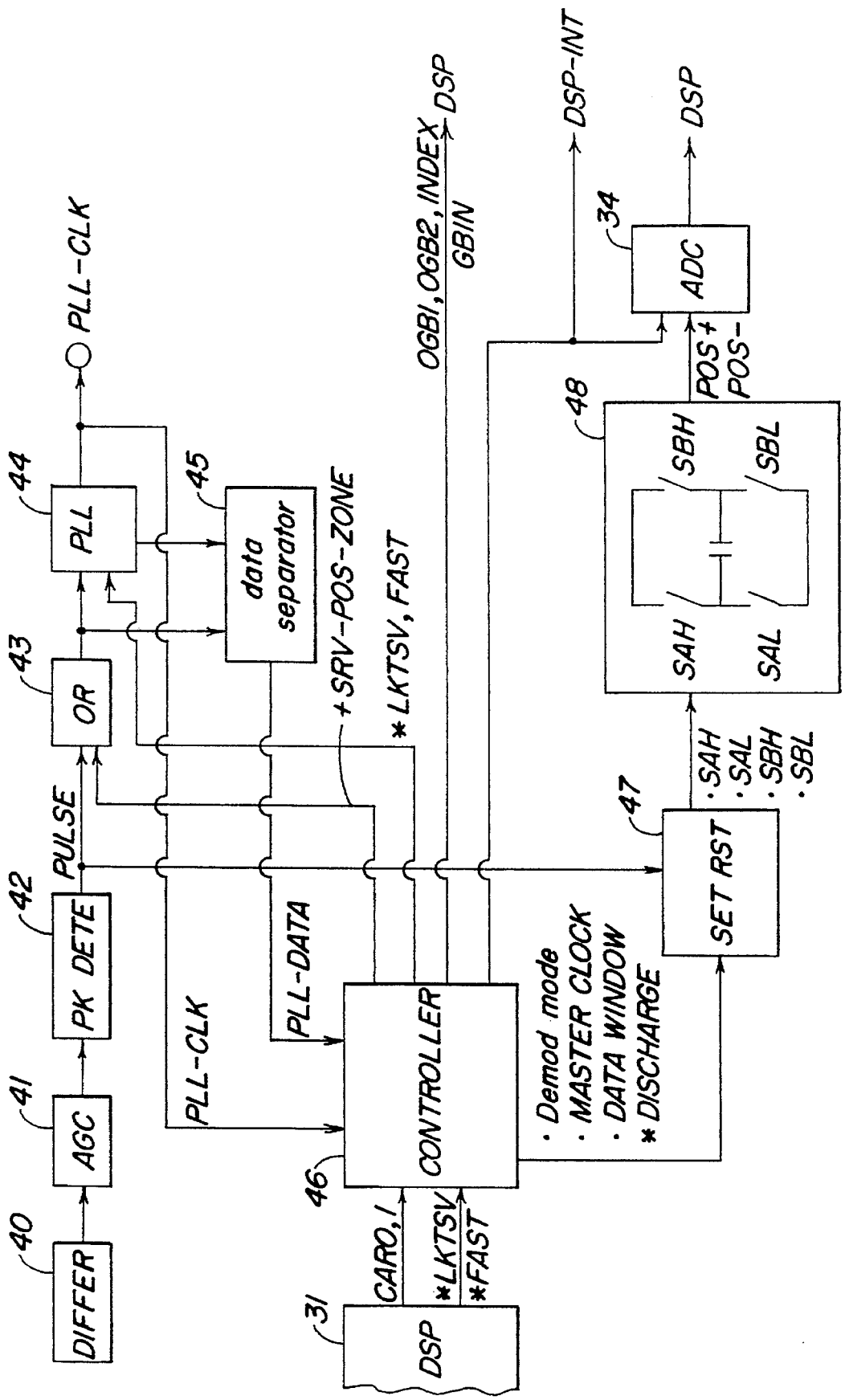
FIG. 16 is a block diagram of a position signal generator shown in FIG. 15.
Figure 17:
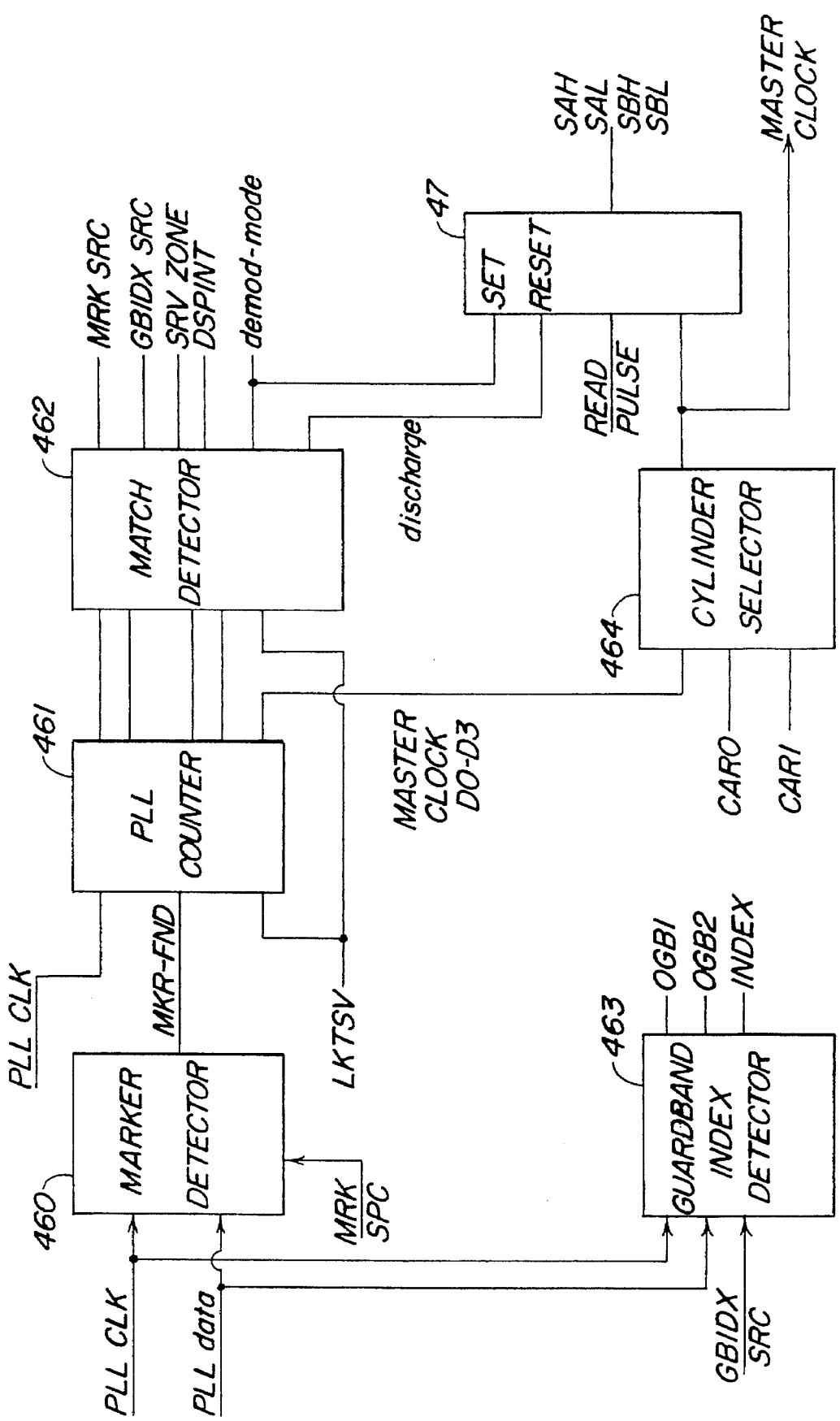
FIG. 17 is a block diagram of a controller shown in FIG. 16.
Figure 18:
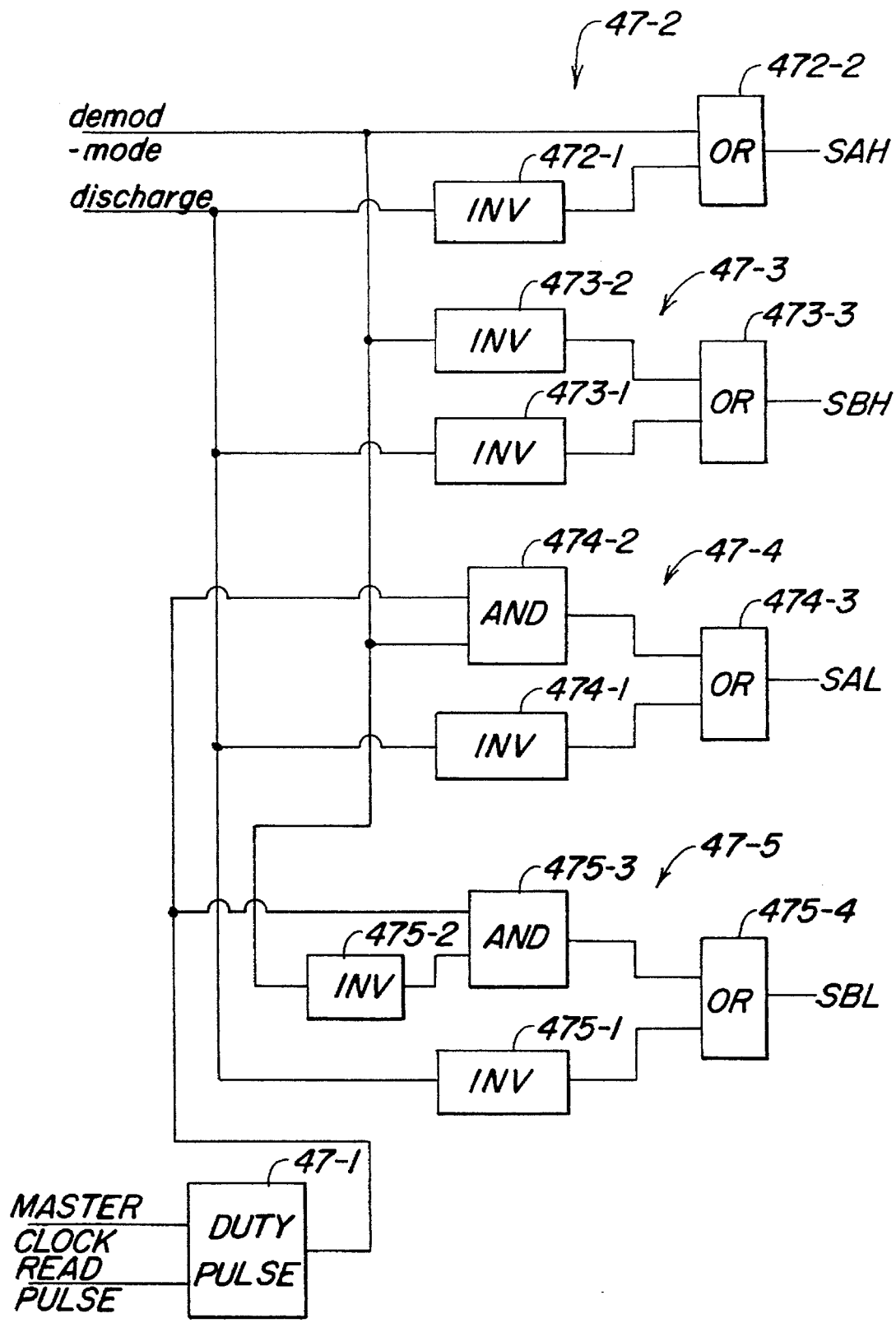
FIG. 18 is a circuit diagram of a set/reset circuit in FIG. 17.
Figure 19A:
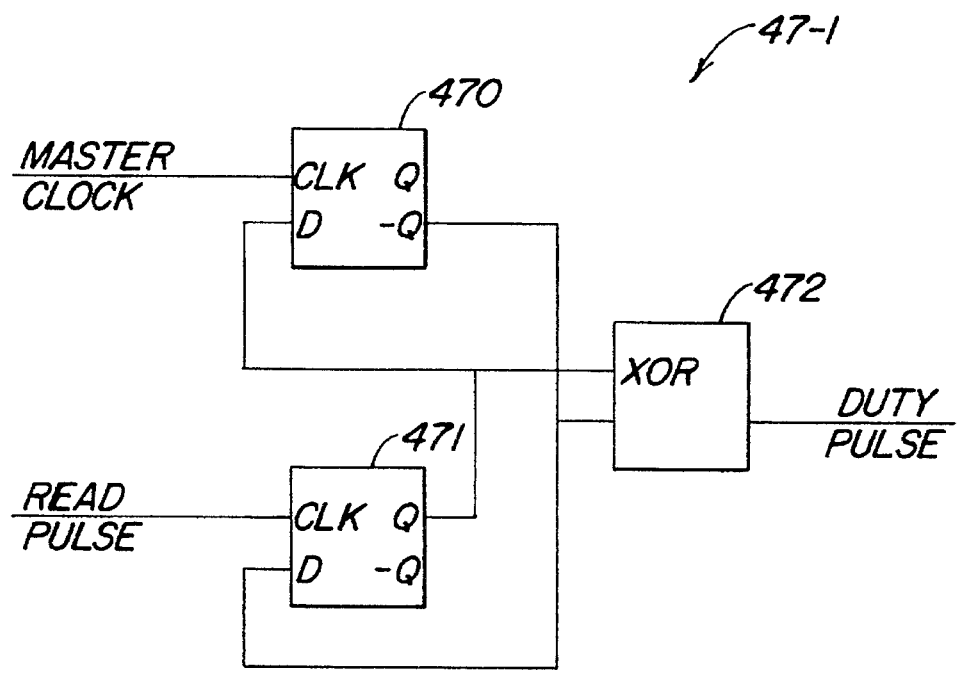
FIG. 19A is a circuit diagram of a duty pulse generator in FIG. 18.
Figure 19B:
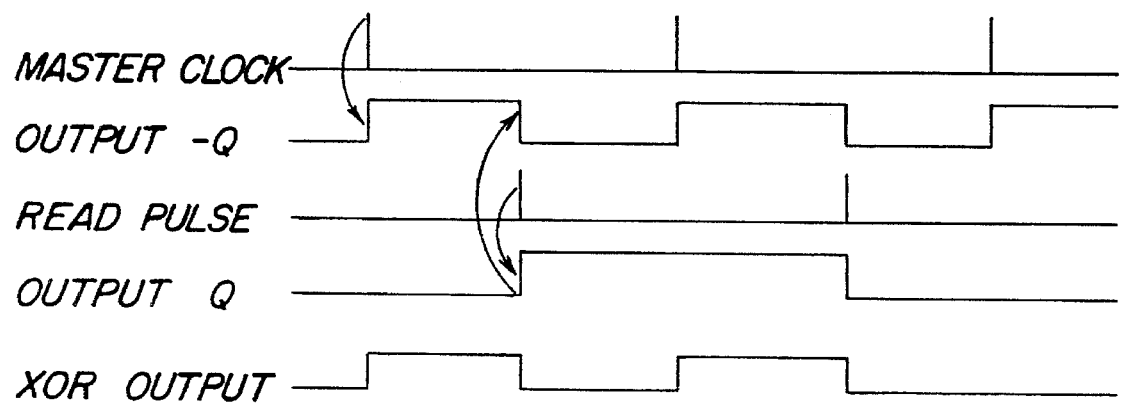
FIG. 19B is a time chart for the circuit shown in FIG. 19A.
Figure 20:
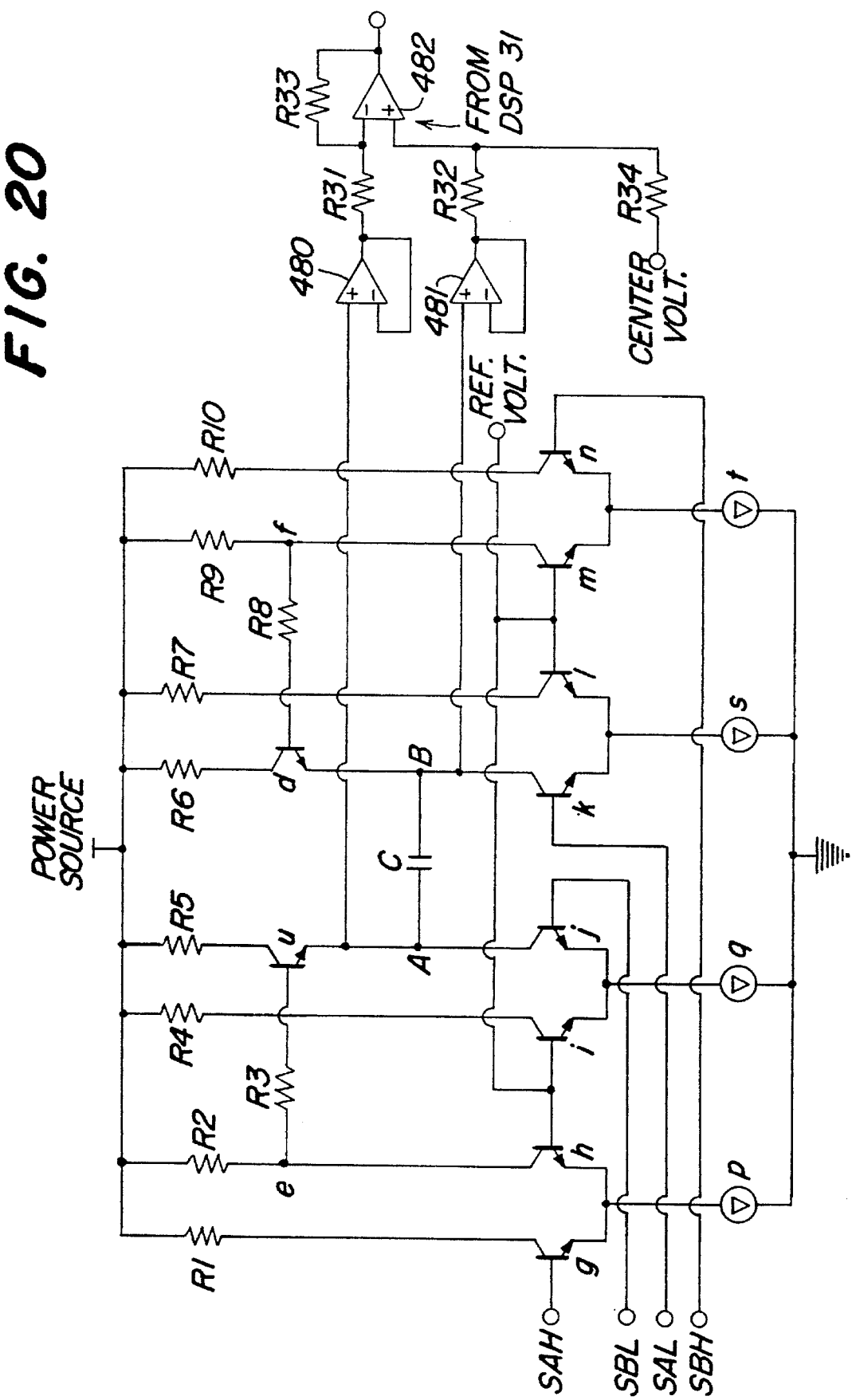
FIG. 20 is a circuit diagram of an integrator shown in FIG. 17.
Figure 21B:
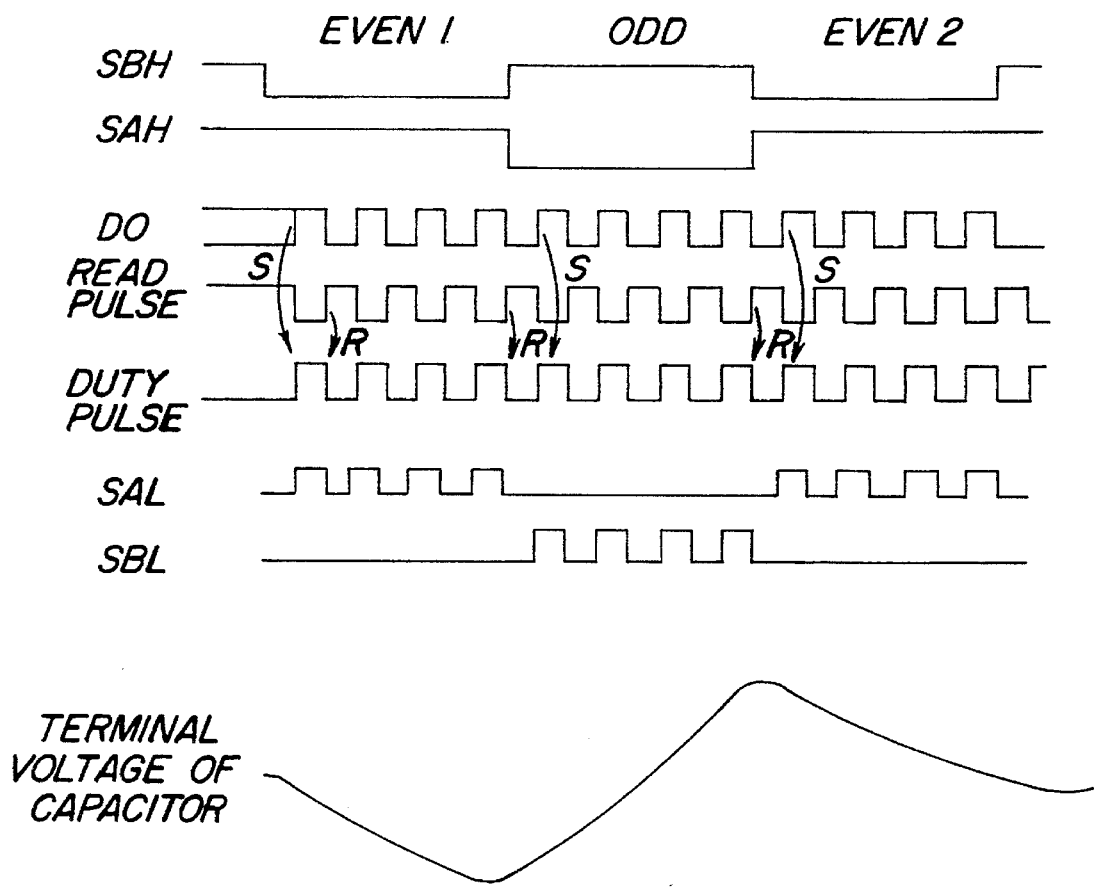
FIG. 21B is a diagram for explaining the operation of the integrator in FIG. 20.

FIG. 16 is a block diagram of the position signal generator shown in FIG. 15, FIG. 17 is a block diagram of a controller shown in FIG. 16, FIG. 18 is a circuit diagram of the phase difference detector in FIG. 17, FIG. 19A is a circuit diagram of a duty pulse generator in FIG. 18, FIG. 19B is a time chart for the circuit shown in FIG. 19A, FIG. 20 is a circuit diagram of an integrator shown in FIG. 17, FIG. 21A is an explanatory diagram of a reference clock, and FIG. 21B is a time chart for the integrator in FIG. 20.

In FIG. 16, a differential circuit 40 converts the output of the servo head 23-10 into a differential output. An AGC (Automatic Gain Control) circuit 41 controls the amplitude of the output of the differential circuit 40 to a constant level. A peak detector 42 outputs a peak pulse when detecting that the level of the output of the AGC circuit 41 is equal to or above a given level and the differential waveform is zero. An OR gate 43 inhibits the output of the peak pulse (read pulse) to the PLL circuit 44 in response to a servo zone signal SRV-POS-ZONE from a controller 46 which will be described later.

The PLL circuit 44 generates a clock PLL-CLK phase-synchronized with the read pulse from the OR gate 43. A data separator 45 synchronizes the read pulse from the OR gate 43 with the clock PLL-CLK from the PLL circuit 44 and outputs PLL sync ronized data PLL-DATA. The controller 46 detects a marker pattern from the sync ronized data PLL-DATA, performs a guard band/index detection and generates the servo zone signal SRV-POS-ZONE. Further, the controller 46 controls a set/reset circuit (phase difference detector) 47 and the A/D converter 34; this controller 46 will be described later with reference to FIG. 17.

The set/reset circuit (phase difference detector) 47 produces a duty pulse having a width corresponding to the phase difference between a master clock MASTER-CLOCK from the controller 46 and the read pulse READ-PULSE from the peak detector 42; this circuit 47 will be described later with reference to FIGS. 18 and 19A. The integrator 48 integrates the duty pulse from the set/reset circuit 47 to produce a position signal of a level corresponding to the phase difference, and its description will be given later referring to FIG. 20.

The structure of the controller 46 will now be discussed referring to FIG. 17. A marker detector 460 performs a marker search operation in response to a marker search signal MRK-SRC to detect the marker pattern, explained earlier with reference to FIG. 9, from the PLL clock and PLL data, and outputs a marker detection signal MKR-FND. A PLL counter 461 starts counting the PLL clock PLL-CLK in accordance with the marker detection signal.

A match detector 462 outputs the marker search signal MRK-SRC, a guard band/index search signal GBIDX-SRC, a DSP interrupt signal DSP-INT, a demodulation mode signal "demod-mode" and a "discharge" indicate signal discharge in accordance with the count value of the PLL counter 461, as will be described later with reference to FIG. 22. A guard band/index detector 463 performs a search operation in response to the guard band/index search signal GBIDX-SRC to detect the guard band signals OGB1 and OGB2, which have been explained with reference to FIGS. 9 and 10, and the index signal INDEX from the PLL clock and PLL data, and outputs the detected signal to the main control circuit 30.

A cylinder selector (clock selector) 464 selectively outputs one of four-phase master clocks D0 to D3 from the PLL counter 461 as the master clock MASTER-CLOCK in accordance with 2-bit cylinder designate signals CAR0 and CAR1 from the DSP 31. The set/reset circuit 47 produces a duty pulse having a width corresponding to the phase difference between the master clock and the read pulse, and produces drive signals SAH, SAL, SBH and SBL for the integrator 48 in accordance with the demodulation mode signal demod-mode and discharge indicate signal "discharge."

As shown in FIG. 18, the set/reset circuit 47 has a duty generator 47-1 for producing a duty pulse having a width corresponding to the phase difference between the master clock. The output of the duty generator 47-1 is a pulse which has a width corresponding to the phase difference between the read pulse of each servo data and the master clock, and is as shown in FIG. 21B. The duty generator 47-1 will now be described with reference to FIG. 19A. In FIG. 19A, a flip-flop 470 holds data when the master clock is input to its clock input. A flip-flop 471 holds data when the read pulse is input to its clock input. An exclusive OR (EXOR) gate 472 outputs an exclusive OR of the −Q output of the flip-flop 470 and the Q output of the flip-flop 471 as the duty pulse.

This circuit 47 functions in such a way that the −Q output of the flip-flop 470 becomes a low level when the master clock arrives, and the Q output of the flip-flop 471 becomes a high level when the read pulse arrives, as shown in FIG. 19B. Accordingly, the output of the EXOR gate 472 becomes a high level by the master clock and becomes a low level by the read pulse. Therefore, the duty pulse having a width corresponding to the phase difference will be output. The thus designed circuit can generate a duty pulse having a width of a highly accurate phase difference, with a simple structure.

Returning to FIG. 18, a first signal generator 47-2 produces the drive signal SAH. This circuit 47-2 has an inverter 472-1 for inverting the discharge indicate signal "discharge," and an OR gate 472-2 which obtains the OR output of the demodulation mode signal "demod-mode" and the output of the inverter 472-1. The output of the OR gate 472-2 becomes the drive signal SAH shown in FIG. 21B. A second signal generator 47-3 produces the drive signal SBH. This circuit 47-3 has an inverter 473-1 for inverting the discharge indicate signal "discharge," an inverter 473-2 for inverting the demodulation mode signal "demod-mode," and an OR gate 473-3 which obtains the OR output of the outputs of both inverters 473-1 and 473-2. The output of the OR gate 473-3 becomes the drive signal SBH shown in FIG. 21B.

A third signal generator 47-4 produces the drive signal SAL. This circuit 47-4 has an inverter 474-1 for inverting the discharge indicate signal "discharge," an AND gate 474-2 for obtaining a logical product of the demodulation mode signal "demod-mode" and the duty pulse, and an OR gate 474-3 which obtains the OR output of the output of the AND gate 474-2 and the output of the inverter 474-1. The output of the OR gate 474-3 becomes the drive signal SAL shown in FIG. 21B. A fourth signal generator 47-5 produces the drive signal SBL. This circuit 47-5 has an inverter 475-1 for inverting the discharge indicate signal "discharge," an inverter 475-2 for inverting the demodulation mode signal demod-mode, an AND gate 475-3 for obtaining a logical product of the inverted demodulation mode signal "demod-mode" and the duty pulse, and an OR gate 475-4 which obtains the OR output of the outputs of the output of the AND gate 475-3 and the output of the inverter 475-1. The output of the OR gate 475-4 becomes the drive signal SBL shown in FIG. 21B.

The structure of the integrator 48 will now be described referring to FIG. 20. In FIG. 20, there are eight current switches (transistors) g, h, i, j, k, l, m and n connected in parallel to resistors R1, R2, R4, R5, R6, R7, R9 and R10 with respect to the power sources. The current switch g is driven by the drive signal BAH, and the current switch j is driven by the drive signal SBL. The current switch k is driven by the drive signal SAL, and the current switch n is driven by the drive signal SBH. A reference voltage is supplied to the current switches h, i, l and m.

The emitters of those eight current switches g, h, i, j, k, l, m and n are connected to constant current sources p, q, s and t. An integration capacitor C for performing an integrating operation is connected via the resistors R5 and R6 to transistors u and d with respect to the power sources, and is connected to the node between the current switches j and k. The bases of the transistors u and d are connected via the resistors R3 and R8 to the current switches h and m.

Both ends A and B of the integration capacitor C are connected to a pair of operational amplifiers 480 and 481 each of a voltage-follower type. The outputs of the individual operational amplifiers 480 and 481 are input to a differential amplifier 482 via input resistors R31 and R32, respectively. The gain of this differential amplifier 482 can be varied by the DSP 31. A resistor R33 is a feedback resistor of the differential amplifier 482, and a resistor R34 is an input resistor for inputting the center voltage for the differential amplifier 482.

The basic operation of this integrator 48 will be discussed below referring to FIGS. 21A and 21B. First, as shown in FIG. 21B, the drive signal SAH becomes a high level in the two periods of EVEN1 of the servo area, and the drive signal SBH becomes a high level in the ODD period of the servo area. Those drive signals SAH and SBH indicate the EVEN and ODD periods of each servo area.

A duty pulse is produced from the master clock D0 and the read pulse as shown in FIG. 21B. The EVEN drive signal SAL is a duty pulse only for the EVEN period, while the ODD drive signal SBL is a duty pulse only for the ODD period.

In the EVEN period, the current switch g is turned on by the drive signal SAH, switching off the current switch h. At this time, as the current switch h is switched off, a current hardly flows across the resistors R2 and R3, turning on the transistor u. The current switch k is driven by the EVEN drive signal SAL, so that a constant current flows through the pass of R5-u-A-C-B-k-s during the ON duration of the EVEN drive signal SAL, charging the capacitor C.

In the ODD period, likewise, the current switch n is turned on by the drive signal SBH, switching off the current switch m. At this time, as the current switch m is switched off, a current hardly flows across the resistors R8 and R9, turning on the transistor d. The current switch j is driven by the ODD drive signal SBL, so that a constant current flows through the pass of R6-d-B-C-A-j-q during the ON duration of the ODD drive signal SBL, reversely charging the capacitor C.

The terminal voltage of the capacitor C rises in one direction in the EVEN1 period, rises in the reverse direction in the ODD period and rises in said one direction in the EVEN2 period, as illustrated, in accordance with the duty ratio of the duty pulse. In this manner, the average of the phase differences will be obtained easily.

To discharge this capacitor voltage, the drive signals SAH, SBH, SAL and SBL are set to a high level (e.g., equal to or above a reference voltage). As a result, the transistors g, j, k and n are turned on. The ON action of the current switch g turns off the current switch h. Since the current switch h is turned off at this time, a current hardly flows across the resistors R2 and R3, setting the transistor u on. The emitter (A terminal) voltage of the transistor u becomes stable at the voltage obtained by subtracting the voltage drop by the resistors R2 and R3 and the base-emitter voltage drop of the transistor u from the source voltage.

At this time, the voltage drop by the resistors R2 and R3 can be neglected and the base-emitter voltage drop is about 0.7 V, so that the voltage at the A terminal becomes about 0.7 V subtracted from the source voltage.

Likewise, the ON action of the current switch n turns off the current switch m. Since the current switch m is turned off at this time, a current hardly flows across the resistors R8 and R9, setting the transistor d on. Therefore, the voltage at the B terminal becomes about 0.7 V subtracted from the source voltage.

As a voltage is generated in the capacitor C before discharge, if the voltage at the A terminal is higher than that at the B terminal, the emitter voltage of the transistor u becomes higher than that of the transistor d, turning on the transistors d, j and k. Therefore, the current equally flows through the two routes B-C-A-j-q and B-k-s via the transistor d from the resistor R6. As a result, the voltage at the A terminal gradually drops. When the voltage at the A terminal becomes equal to the voltage at the B terminal, the transistor u is turned on, making the current flowing through the routine R5-u-A-j-q equal to the current flowing through the routine R6-d-B-k-s, stabilizing the current. Even when the voltage of the capacitor before discharge is the opposite one, the operation becomes symmetric to the above-described operation, and discharging is executed similarly.

The average of phase differences can be obtained easily through an integrating operation in this manner, and what is more, the use of the analog circuit will generate a position signal without a delay even if the seek speed becomes faster.

In the circuit for supplying the terminal voltage across the capacity C to the A/D converter 34, the impedance should be reduced. That is, if the terminal voltage of the capacitor C is simply input to the resistors R31 and R32 and their differential output is obtained by the differential amplifier 482 in FIG. 20, the voltage of the capacitor C is discharged via the resistor R34 from the resistor R31, so that the proper integrating operation cannot be performed. In this respect, the operational amplifiers 480 and 481 of a voltage-follower type are provided to receive the terminal voltage across the capacitor C, thus reducing the impedance. Accordingly, the outputs of the operational amplifiers 480 and 481 are directly the voltage of the capacitor C, and the operational amplifier 482 for outputting the potential difference outputs the potential at the point B minus the potential at the point A plus the center voltage. By selecting this center voltage as the intermediate voltage of the A/D converter 34, it is possible to obtain a voltage suitable for the A/D converter 34.

Further, if the gain of this differential amplifier 482 is allowed to be changeable by the DSP 31, A/D conversion of a voltage output over a wide range is possible with a low gain under coarse control, while A/D conversion with high resolution over a narrow range is possible with a high gain under fine control. It is therefore possible to obtain a position signal with the resolution corresponding to the coarse/fine control.

The operation of the structure as shown in FIGS. 16 and 17 will be described below. FIG. 22 presents a time chart for the position detecting operation, FIGS. 23A and 23B, FIGS. 24A through 24C and FIG. 25 are diagrams for explaining the cylinder selecting operation.

The general operation of the structure shown in FIGS. 16 and 17 will be discussed according to the time chart in FIG. 22. In FIG. 16, the output of the servo head 23-10 is input to the differential amplifier 40 to provide a differential output, and the amplitude is averaged by the AGC circuit 41. The AGC is executed because the amplitude of the read output differs due to a production variation in magnetic disks or a production variation in magnetic heads.

Then, the peak of the output of the AGC circuit 41 is detected by the peak detector 42 to become a read pulse. This pulse is input via the OR gate 4B to the PLL circuit 44. The PLL circuit 44 generates the clock PLL-CLK synchronous with the read pulse. It is when the servo head 23-10 lies outside the servo area that the PLL circuit 44 should be synchronized. This is because that the phase of the read pulse differs in the servo area depending on the position of the servo head, so that if the PLL circuit. 44 is synchronized with this read pulse, the phase difference corresponding the head position will not be obtained.

When the servo head is positioned in the servo area, therefore, the servo area signal SRV-POS-ZONE from the controller 46 becomes a high level, causing every output of the OR gate 43 to become a high level. This inhibits the inputting of the read pulse to the PLL circuit 44 and sets the PLL circuit 44 in a hold state. Then, the data separator 45 outputs the read pulse as the synchronized data PLL-DATA in synchronous with the clock from the PLL circuit 44. In this case too, because no synchronizing operation will not be performed in the servo area, the read pulse from the OR gate 43 is synchronized.

The lock-to-servo signal LKTSV and fast signal FAST, which are output to the PLL circuit 44 from the controller 46, instruct the PLL circuit 44 to execute an operation. The fast signal FAST instructs to set the retracting operation of the PLL circuit 44 in fast mode or slow mode. In fast mode, the range of the frequency drawing of the PLL becomes wider with lower drawing precision. In slow mode, on the other hand, the range of the frequency drawing of the PLL becomes narrower with higher drawing precision. Accordingly, the designation of FAST is used in such a way as to execute frequency drawing in fast mode and return to the slow mode until the demodulation becomes possible.

Then, the marker search signal has a high level in the training area and the marker area in the controller 46. The marker detector 460 in FIG. 17 searches the PLL data PLL-DATA for the marker pattern in synchronism with the PLL clock. The marker detector 460 is given redundancy. That is, while the marker pattern has five bits of "HHLHH" as described earlier with reference to FIG. 9, the marker detector 460 detects the pattern as a marker even if any one of the five bits differs. Because of this redundancy, the marker detector 460 will not malfunction even when one bit is in error and will detect the marker properly. Therefore, the marker detector 460 detects a marker when any of "HHLHX," "HHLXH," "HHXHH," "HXLHH" and "XHLHH" is satisfied.

When this marker is detected, the marker detector 460 generates the marker detection signal MRK-FND. This causes the PLL counter 461 to start counting the PLL clock. As the counting of the PLL counter 461 starts, the match detector 462 generates the guard band/index search signal, allowing the guard band/index detector 463 to function. At the same time, the match detector 462 sets the marker search signal to a low level, thus inhibiting the searching operation of the marker detector 460. This prevents erroneous detection of a marker.

Since the guard band/index area follows the marker area, the guard band/index detector 463 searches the PLL data PLL-DATA for the guard band pattern and index pattern in synchronism with the PLL clock. When detecting the guard band pattern and index pattern, the guard band/index detector 463 outputs the outer guard band signal (OGB1, OGB2), inner guard band signal (IGB) and index signal (INDEX) to the main control circuit 30 to inform the circuit 30 of the detection.

When the guard band/index area is finished, the count value of the PLL counter 461 becomes 48H, and the match detector 462 sets the guard band/index search signal to a low level to inhibit the search operation of the guard band/index detector 463, thereby preventing any erroneous operation. At the same time, the match detector 462 sets the servo zone signal SRV-POS-ZONE to a high level, informing that the position control advances to the servo area. This will inhibit the follow-up operation of the PLL circuit 44 as described earlier.

The discharge indicate signal "discharge" from the integrator 48 is set to a low level to inhibit the discharging operation and permit the charging operation. Further, the demode mode signal demod-mode is set to a high level for a charging action in the EVEN1 period of the servo area. As shown in FIG. 18, this demodulation mode signal "demod-mode" becomes the drive signal SAH, and its inverted signal becomes the drive signal SBH. Accordingly, the integrator 48 executes the charging operation with the duty pulse in the EVEN1 period of the servo area, as described earlier.

When the EVEN1 period of the servo area ends, the count value of the PLL counter 461 becomes 80H, and the match detector 462 sets the demodulation mode signal "demod-mode" to a low level to inhibit the charging operation with the duty pulse in the EVEN1 period. Consequently, the reverse charging operation with the duty pulse in the ODD period will be performed. Further, when the ODD period of the servo area ends, the count value of the PLL counter 461 becomes D0H, and the match detector 462 sets the demodulation mode signal "demod-mode" to a high level. This inhibits the reverse charging operation with the duty pulse in the ODD period, and permits the charging operation with the duty pulse in the EVEN2 period of the servo area.

Furthermore, when the EVEN2 period of the servo area ends, the count value of the PLL counter 461 becomes 108H, and the match detector 462 sets the demodulation mode signal "demod-mode" to a low level. This completes the charging of the integrator 48. Consequently, the DSP interrupt signal DSP-INT from the match detector 462 becomes a high level, informing the DSP 31 the end of the production of the position signal. At the same time, the A/D conversion of the A/D converter 34 is permitted as shown in FIG. 16.

Consequently, the DSP 31 reads the digital value from the A/D converter B4 to confirm the head position. A margin is provided in the read period of the DSP 31. More specifically, the count value of the PLL counter 461 becomes a predetermined value "120H," the match detector 462 sets the DSP interrupt signal DSP-INT to a low level. The match detector 462 also sets the servo zone signal SRV-POS-ZONE to a high level to permit the follow-up operation of the PLL circuit 44. At the same time, the match detector 462 sets the marker search signal MRK-SRC to a high level to permit the search operation of the marker detector 460. Further, the discharge indicate signal "discharge" is set to a high level to allow the set/reset circuit 47 to discharge the integrator 48.

In this manner, the PLL circuit 44 is subjected to sync control and marker detection is carried out in the training area and marker area. When a marker is detected, the detection of the guard band/index area is permitted for the subsequent guard band/index area. When the guard band/index area is finished, the servo zone signal is generated, inhibiting the PLL follow-up operation. At the same time, the discharge indicate signal is released and the demodulation mode signal is controlled for the integration of the phase difference of the servo area.

When the servo area is finished, the DSP interrupt signal is generated to inform the DSP 31 of the end of the production of the position signal and allow for A/D conversion of the A/D converter 34. Further, when the reading of the position signal by the DSP 31 is completed, the discharging of the integrator 48 is instructed, and the servo zone signal is released to permit the PLL follow-up operation and the marker search.

Figure 1:
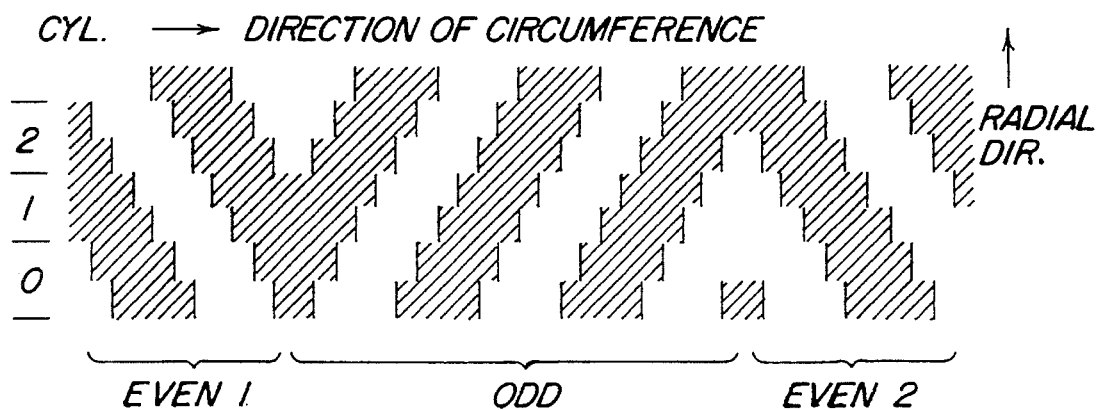
FIG. 1 is an explanatory diagram of a prior art phase type servo pattern.
Figure 2:
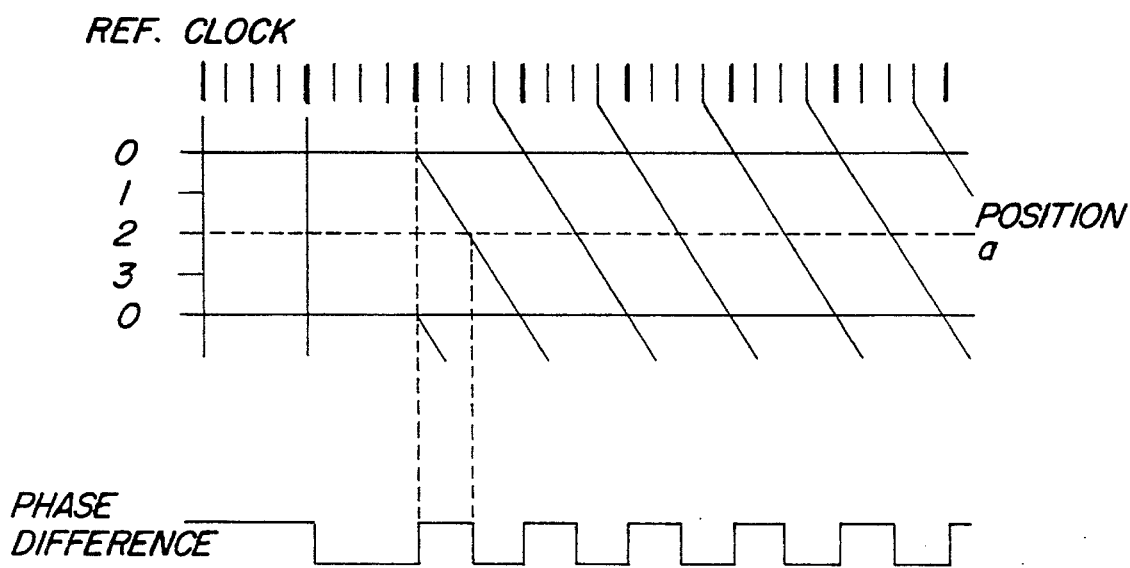
FIG. 2 is an explanatory diagram for explaining a conventional prior art position detecting method of a phase type.

Then, the cylinder selecting system for obtaining the optimal position signal according to the target cylinder position will be discussed referring to FIGS. 23A, 23B, 24A, 24B, 24C and 25. As described earlier, for the reference phase D2 in FIG. 23A which has been explained with respect to the case shown in FIGS. 2 to 4, a phase difference of ½ of the reference period is obtained at the position of the center cylinder 2 among the four cylinders, and the duty pulse becomes 50%. As shown in FIG. 2BA, therefore, the width of the position signal indicates a rectangular waveform having a width around the cylinder 2 within the movement of four cylinders.

In this case, the duty becomes 0% and 100% at the position of the cylinder 0. When a variation occurs at this position, therefore, the head position moves between 0% and 100%, disabling the on-track control. In addition, position detection becomes difficult even under coarse control. Similarly, if the output of integrator at the position of the cylinder 2 is set to zero, the duty becomes 25% and 75% at the positions of the cylinders 1 and 3, thus generating a voltage across the integration capacitor. This means that the output voltages of individual integrators differ due to the inevitable variation in capacitance of the integration capacitor (capacitors would have a variation of several % depending on the temperature), so that the position signal with high precision cannot be obtained.

Figure 23A:
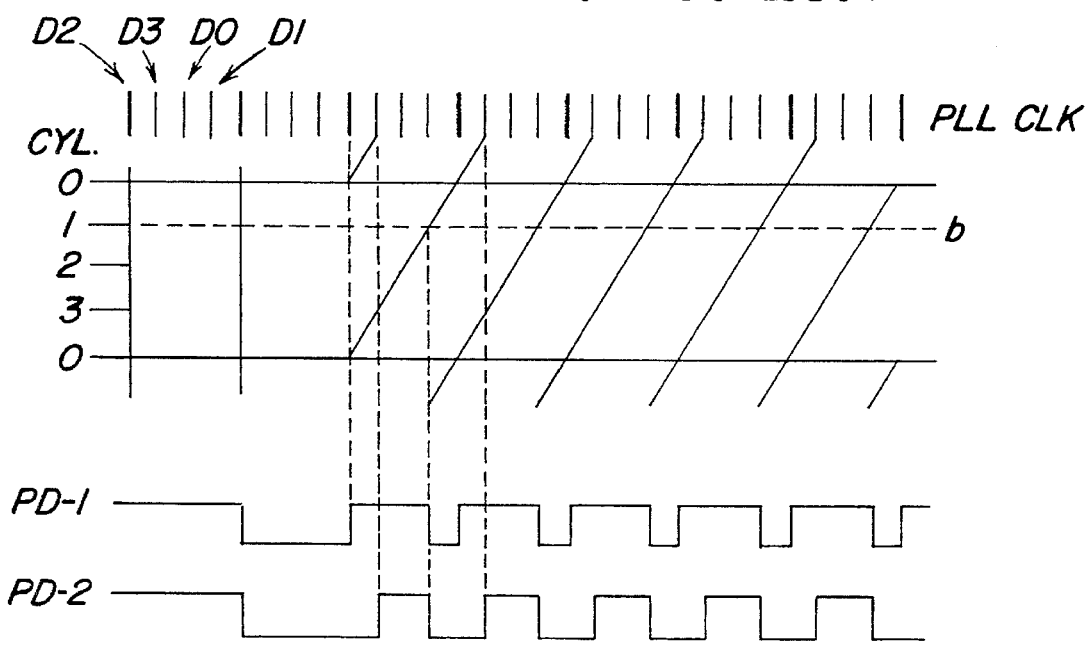
FIGS. 23A and 23B are explanatory diagrams for a cylinder selecting operation.
Figure 23B:
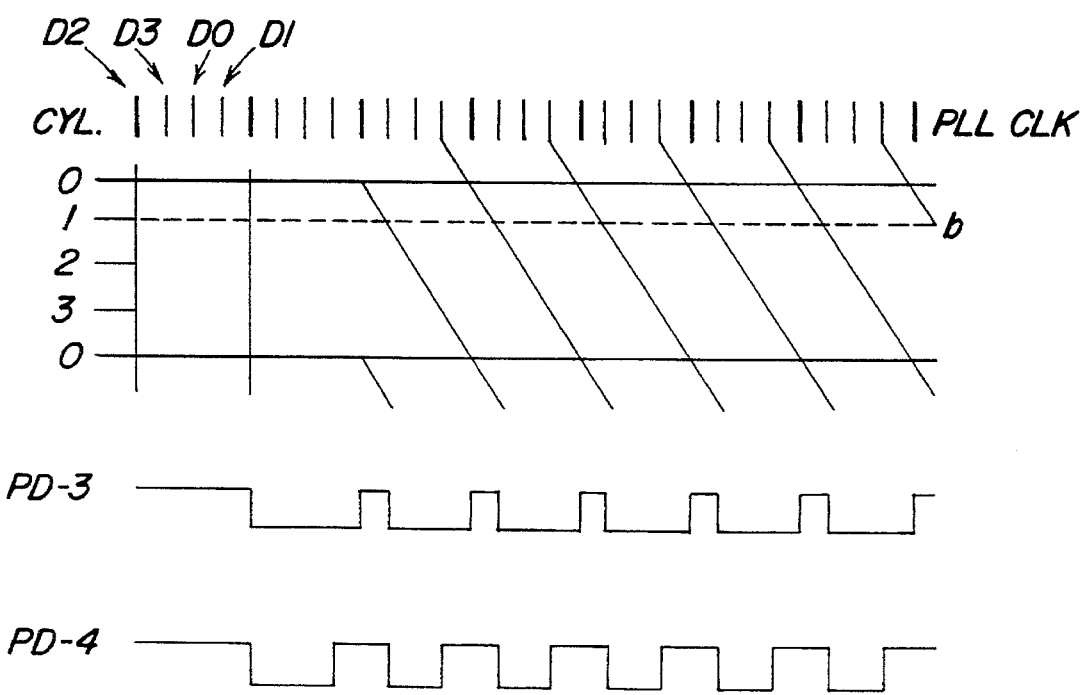

To prevent this shortcoming, the terminal voltage of the capacitor at the target cylinder position has only to be set to "0." Therefore, the cylinder switching is performed. The principle of the cylinder switching will be discussed with reference to FIGS. 23A and 23B. As shown in FIG. 23A, with the target cylinder being the cylinder 1 (position b), the duty pd-1 becomes 75% for the reference phase D2 in the aforementioned ODD area. If the reference phase is set to D3 which lags by one clock and the phase difference between this phase D3 and the duty becomes 50% for the phase difference pd-2 between this phase D3 and that of the read pulse. As shown in FIG. 23B, likewise, the duty pd-3 becomes 25% for the phase difference between the reference phase D2 and that of the read pulse in the aforementioned EVEN area. If the reference phase is set to D1 which leads by one clock, the duty pd-4 becomes 50% for the phase difference between this phase D1 and that of the read pulse.

With the target cylinder being the cylinder 2, therefore, the position signal around the cylinder 2 is obtained for the reference phase of the clock D2, as shown in FIG. 24A. With the target cylinder being the cylinder 1, however, the position signal around the cylinder 1 is obtained for the reference phase of the clock D3 for the EVEN area and the reference phase of the clock D1 for the ODD area, as shown in FIG. 24B.

Likewise, with the target cylinder being the cylinder 3, the position signal around the cylinder 3 is obtained for the reference phase of the clock D1 for the EVEN area and the reference phase of the clock D3 for the ODD area, as shown in FIG. 24C, while with the target cylinder being the cylinder 0, however, the position signal around the cylinder 0 is obtained for the reference phase of the clock D0 for both the EVEN area and the ODD area.

To obtain the proper position signal for the target cylinder, therefore, the DSP 31, which knows the target cylinder, is made to designate the target cylinder position by the cylinder position signals CAR0 and CAR1 as shown in FIGS. 16 and 17. Further, the PLL counter 461 shown in FIG. 14 is permitted to produce four reference clocks PLL-CK4-D0 to PLL-CK4-D3 whose phases are shifted from one another clock by clock, as shown in FIG. 21A.

Then, the cylinder selector 464 in FIG. 17 has only to select one of the four reference clocks PLL-CK4-D0 to PLL-CK4-D3 in accordance with the selecting conditions given in FIG. 25 in response to the cylinder position signals CAR0 and CAR1, and output the selected reference clock as the master clock to the set/reset circuit 47. Accordingly, the phase difference between the master clock corresponding to the target cylinder and the read pulse is detected and the duty pulse corresponding to that phase difference is output, so that the position signal indicated by the integrated output will have an amplitude around the target cylinder, as described earlier. In this manner, on-track is possible with the terminal voltage of the capacitor of the integrator 48 of 0 for all of the four cylinders.

As described above, the marker area for establishing the position of the servo area is provided after the training area on the magnetic disk 21, and this marker pattern is detected to control the operations of the phase difference detector 47 and the PLL circuit 44. Therefore, the phase difference detector 47 can detect the phase difference based on a signal from the servo area alone, and the phase synchronization of the PLL circuit 44 can be accomplished by a signal from an area other than the servo area, thus preventing an erroneous operation.

The guard band/index area having guard band data and index data recorded therein is provided after the marker area. And, the controller 46 detects the guard band data and the index data from the output of the head 23 in accordance with the detection of the marker pattern. It is therefore possible to include the guard band data and index data in the servo frame and their extraction becomes easy.

Further, the guard band/index area is recorded in such a way that the shift of the position of magnetism inversion from a specific cycle is taken as "1" and the position of magnetism inversion being that specific cycle is taken as "0." As the phase of the peak is given with data, the guard band data can be read accurately.

Further, if the servo data consists of first and third fields having one phase shift and a second field having the opposite phase shift so that the head position can be detected at the center of the servo data, the duty pulse is converted to an integrated voltage, thus facilitating the integrating operation according to the phase difference. Because the differences between the second field and the first and third fields are obtained, the voltage output for the center track becomes zero, thus yielding a position signal which will not be affected by the characteristic of the capacitor of the integrator.

As the integrator 48 comprises two transistors connected to both ends of the integration capacitor, two sets of first current switches for driving the transistor, two sets of second current switches connected to both ends of the integration capacitor, and four constant current circuits respectively connected to the first and second current switches, it is possible to output a position signal corresponding to an accurate phase difference. Since the integrator 48 is designed in such a way that the individual current circuits connected to the individual current switches have the same basic circuit, the integrating operation according to the phase difference can be executed at higher precision.

Further, because the integrator 48 has a pair of first operational amplifiers of a voltage-follower type for receiving the terminal voltage of the integration capacitor, it is possible to prevent the terminal voltage of the integration capacitor from dropping. As the integrator 48 has another operational amplifier for obtaining the difference between the outputs of said pair of the former pair of operational amplifiers, the differential output can be converted to a single output to ensure A/D conversion.

The phase difference detector 47 has a flip-flop to be set at the rising of the reference clock, another flip-flop to be set at the rising of the read pulse, and an EXOR gate for obtaining an exclusive OR of the outputs of both flip-flops and outputting a duty pulse. It is therefore possible to produce a duty pulse for integration with a simple structure.

Figure 26:
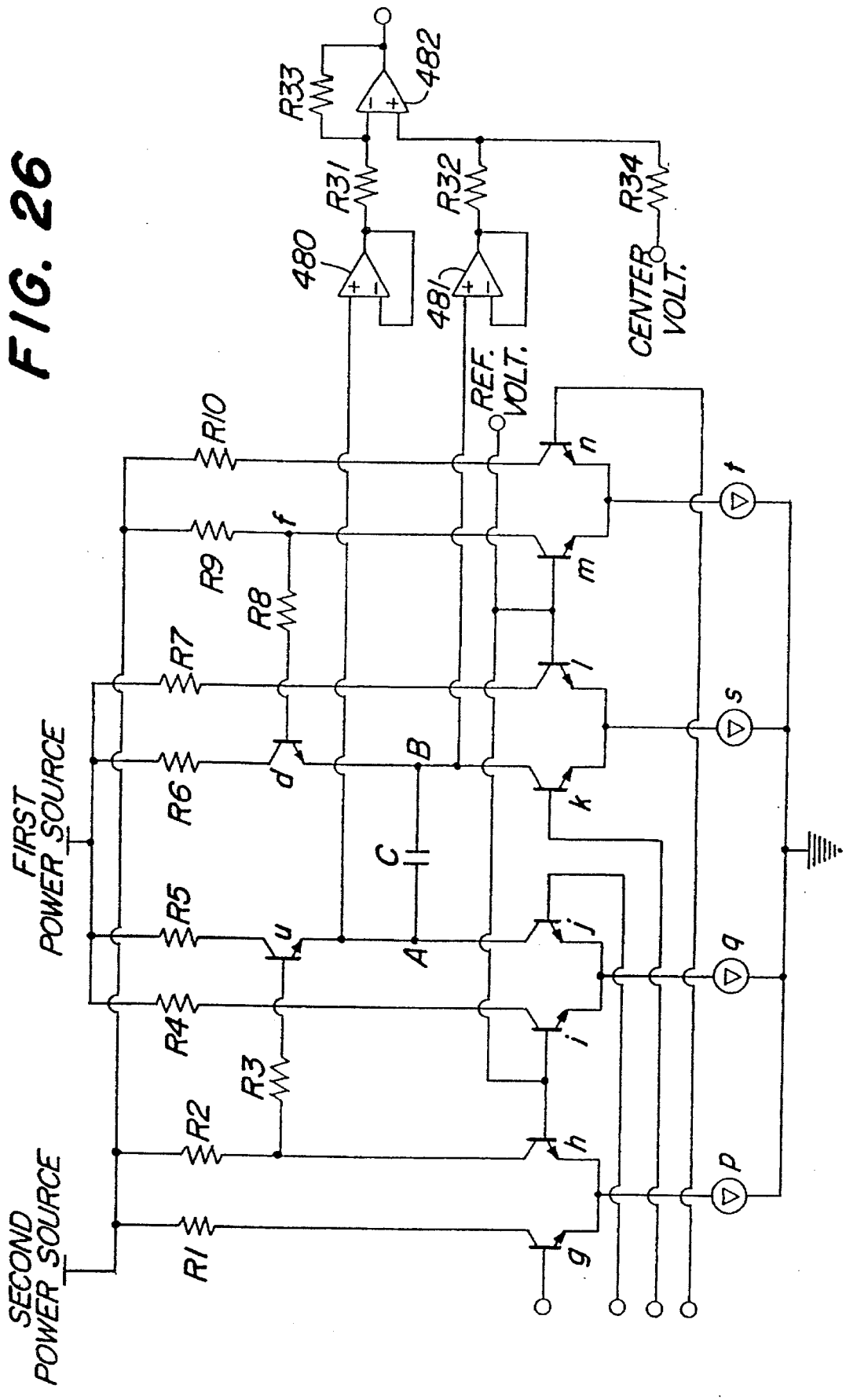
FIG. 26 is a circuit diagram showing a modification of the integrator.

FIG. 26 is a circuit diagram showing a modification of the integrator. The same reference numerals as used in FIG. 20 are used to denote the corresponding or identical components in FIG. 26. In this embodiment, two power sources are provided, one for applying a voltage to the transistors u and d and the current switches i, j, k and l and the other for applying a voltage to the current switches g, h, m and n. The voltage of the second power source is set lower than that of the first power source.

This design is employed because the voltage at the terminal B of the capacitor C becomes higher than the voltage at the terminal A when the current flow starts. Unless the voltage of the second power source is set lower than that of the first power source, the voltage at the terminal A becomes higher than the voltage of the first power source. In this case, the transistor u may malfunction as an inverse transistor. Further, the operational amplifiers 480 and 481, located at the subsequent stage to buffer the voltages at the terminals A and B, may undesirably function beyond the operational voltage range.

In this embodiment, the second power source is provided to set the voltage of the second power source lower than that of the first power source by the operational voltage of the capacitor C, thereby preventing the malfunction. Since the integrator 48 has the first power source for the transistors and the second current switches and the second power source for the first current switches, the voltage of the integration capacitor can be suppressed to or below the operational voltage, thereby preventing the malfunction.

Figure 27:
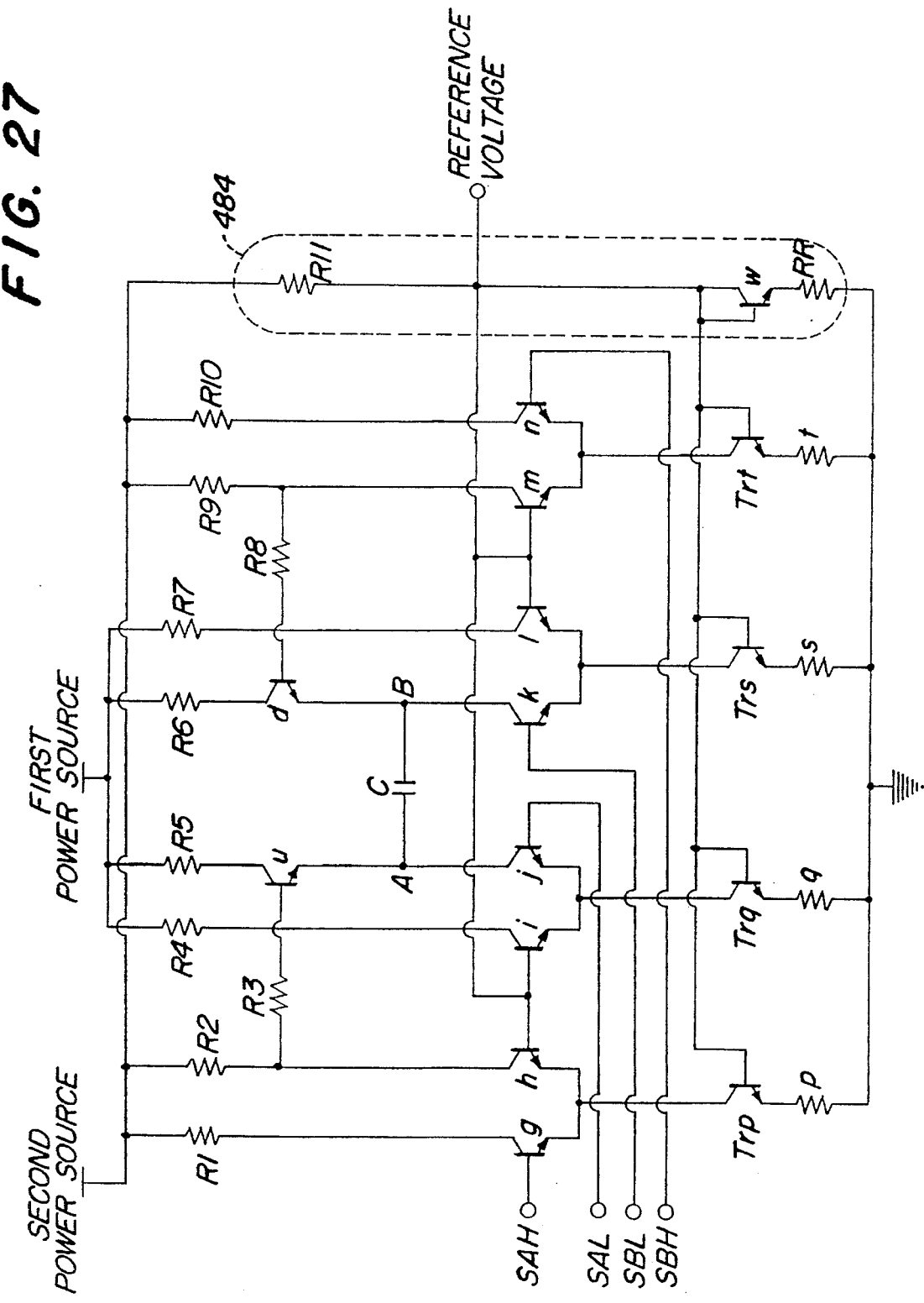
FIG. 27 is a circuit diagram showing another modification of the integrator.

FIG. 27 is a circuit diagram showing a modification of the integrator. The same reference numerals as used in FIG. 20 are used to denote the corresponding or identical components in FIG. 27. This embodiment is designed to eliminate a variation in current from the constant current source.

More specifically, a transistor Trs of a constant current source s supplies a constant current in the aforementioned EVEN area, while a transistor Trq of a constant current source q supplies a constant current in the aforementioned ODD area. If the amounts of those two currents differ from each other, a voltage is generated at both ends of the capacitor C under the on-track condition, which may cause off-tracking.

Therefore, the base of the transistor Trs of the constant current source s and the base of the transistor Trq of the constant current source q are connected to the same reference circuit 484. This reference circuit 484 causes the second power source to be grounded via a resistor R11, a transistor w and a resistor R12. This reference circuit 484 can eliminate a variation in currents from both constant current sources s and q, thus improving the on-tracking precision.

While the reference circuit for a transistor Trp of a constant current source p and a transistor Trt of a constant current source t may be provided separate from the former one, one reference circuit is shared in this example for a simpler structure.

Figure 28:
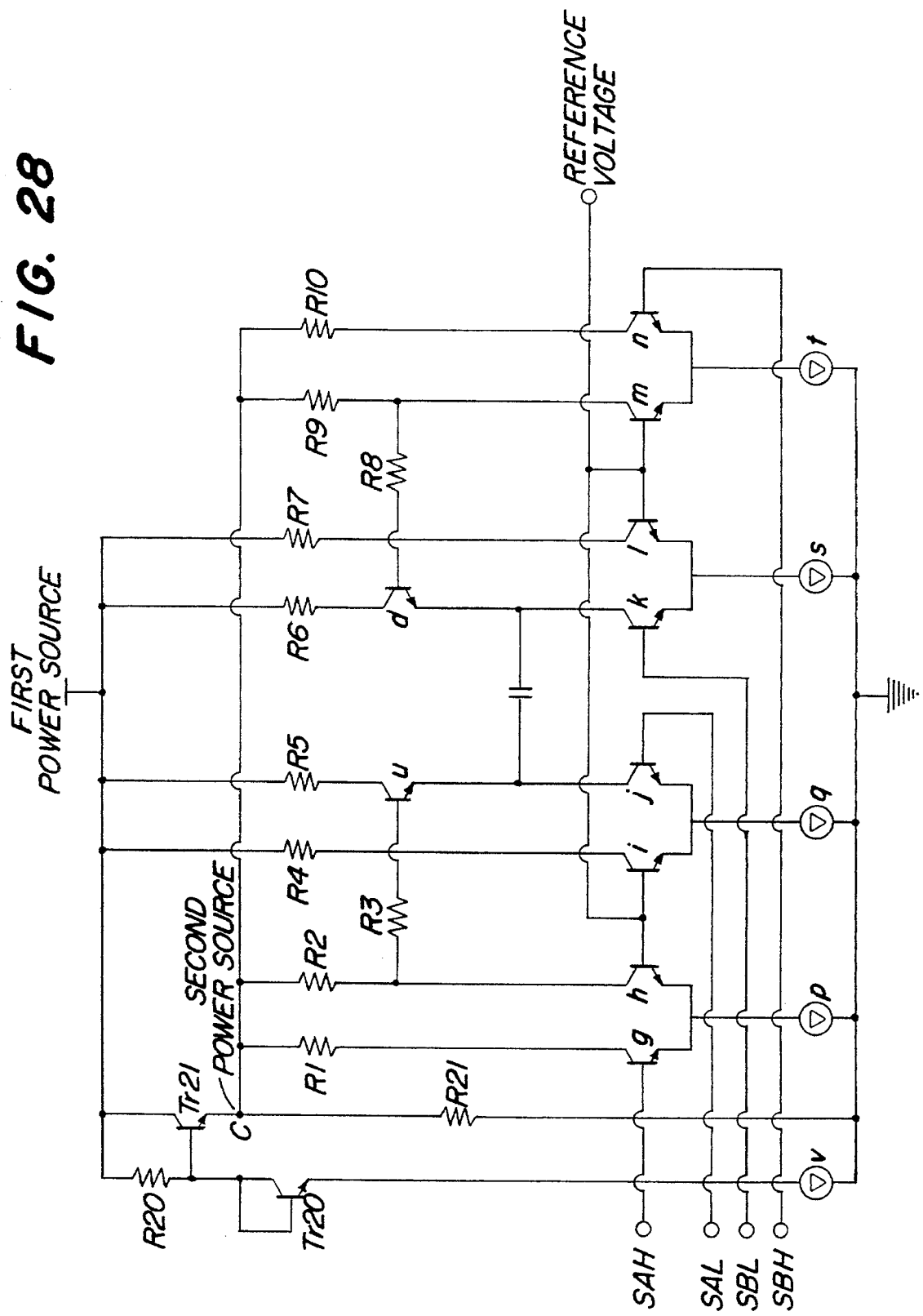
FIG. 28 is a circuit diagram showing a further modification of the integrator.

FIG. 28 is a circuit diagram showing another modification of the integrator. The same reference numerals as used in FIGS. 20 and 26 are used to denote the corresponding or identical components in FIG. 28. In this embodiment, the second power source is prepared by using the first power source.

More specifically, a circuit of a resistor R20, a transistor Tr20 and a constant current source v, and a circuit of a transistor Tr21 and a resistor R21 are provided in parallel as the second power source. The transistors Tr20 and Tr21 function as a base-emitter voltage compensating diode. The voltage of the second power source is the voltage of the first power source from which the resistance R20×the constant current plus the base-emitter voltage is subtracted. This circuit allows the integrator to function on a single power source without using a separate power source, thus contributing to simplifying the overall circuit. This embodiment therefore does not require two separate power sources and can suppress the voltage of the integration capacitor to or below the operational voltage, thereby preventing malfunction.

Figure 29:
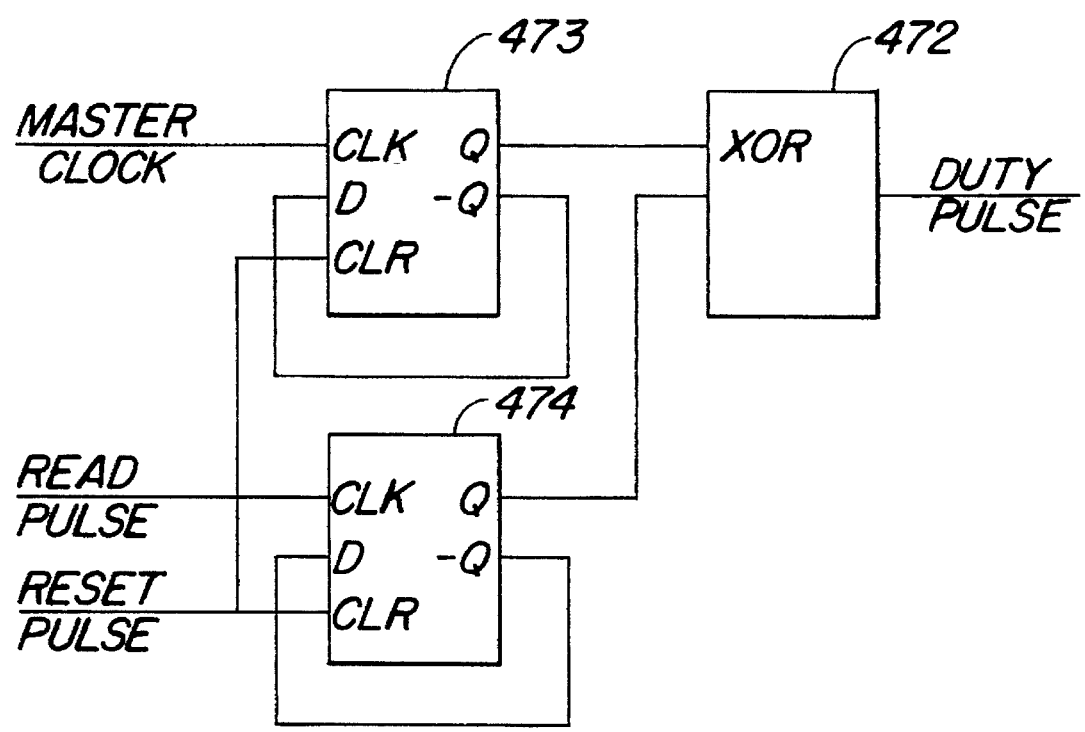
FIG. 29 is a circuit diagram showing a modification of the duty pulse generator.

FIG. 29 is a circuit diagram showing a modification of the duty generator. The same reference numerals as used in FIG. 19A are used to denote the corresponding or identical components in FIG. 29. Flip-flops 473 and 474 are reset by a reset pulse and are set respectively by a master clock and a read pulse. In this embodiment, while the reset pulse is required at the beginning, a duty pulse can be generated through the same operation as done by the circuit of FIG. 19A.

Although the foregoing description of the individual embodiments of this invention has been given with reference to the case where the servo pattern is provided on the servo surface, this invention may be adapted for a sector servo system which has a servo pattern on the data surface. The length of the servo frame can be properly selected as needed.

As the reference clock is synchronized with the servo pattern, the phase difference can be detected with high precision and the accuracy for the position detection can be improved. As the integrator is used to generate a position signal according to the phase difference, the average of the phase differences can be obtained easily and in real time, thus also improving the accuracy for the position detection. Further, since the phase of the reference clock is changed in accordance with the cylinder position, the optimal position signal for the target cylinder position will be obtained. This will also improve the accuracy for the position detection with respect to the target cylinder.

What is claimed is:

1. A method for detecting a head position by reading servo data from a recording medium having a plurality of tracks, said servo data being recorded on each said track and including at least a timing pattern, position pattern and marker data recorded between the timing pattern and position pattern having different phases between the adjacent tracks, said method comprising the steps of:

reproducing a timing signal, position signal and marker signal corresponding to the timing pattern, position pattern and marker data;

generating reference clocks;

synchronizing the reference clocks with the timing signal;

generating a phase difference signal indicating a phase difference between the position signal and the synchronized reference clock;

generating a head position signal from the phase difference signal;

detecting the marker data from the marker signal; and stopping a synchronous operation of the reference clocks, when the marker data is detected.

2. The head position detecting method according to claim 1, wherein said reproducing step includes a step of reproducing a guard band signal and an index signal from guard band data and index data recorded between said marker data and said position pattern on said recording medium; and said method further comprises a step of detecting said guard band data and said index data from said guard band signal and said index signal in accordance with detection of said marker data.

3. The head position detecting method according to claim 2, wherein said detecting step is to detect said guard band data and said index data, with a position of magnetism inversion on said recording disk from a specific cycle taken as "0" and a shift of said position of magnetism inversion being taken as "1".

4. The head position detecting method according to claim 1, wherein said head position signal generating step is to integrate said phase difference signal by an integrator in accordance with detection of said marker data.

5. The head position detecting method according to claim 4, wherein said head position signal generating step includes a step of performing analog-to-digital conversion of an integration amount of said integrator after integration of said phase difference signal, and then discharging said integrator.

6. The head position detecting method according to claim 1, further comprising a step of selecting that reference clock which has a phase corresponding to a target track from said synchronized reference clocks.

7. A method for detecting a head position by reading servo data from a recording medium having a plurality of tracks, said servo data being recorded on each said track and including at least a position pattern having different phases between the adjacent tracks, comprising the steps of:

reproducing a servo signal from said servo data;

generating a plurality of reference clocks of different phases corresponding to said tracks;

selecting a reference clock which corresponds to a target track, from among said plurality of reference clocks;

generating a phase difference signal indicating a phase difference between a read pulse of said servo signal and said selected reference clock; and generating a head position signal indicating said position of said head from said phase difference signal.

8. The head position detecting method according to claim 7, wherein said head position signal generating step is to integrate said phase difference signal by means of an integrator.

9. The head position detecting method according to claim 8, further comprising a step of discharging said integrator after integration of said phase difference signal.

10. The head position detecting method according to claim 9, further comprising a step of performing analog-to-digital conversion of an integration amount of said integrator before discharging said integrator after integration of said phase difference signal by said integrator based on said servo data.

11. An apparatus for detecting a head position by reading servo data from a recording medium having a plurality of tracks, said servo data being recorded on each said track and including at least a timing pattern, position pattern having different phases between the adjacent tracks and a marker pattern, said apparatus comprising:

a recording disk on which a training area having the timing pattern recorded therein is provided before a servo area having said position pattern recorded therein and on which a marker area having a marker pattern recorded therein for securing a position of said servo area is provided after said training area on said recording medium;

a phase-lock loop circuit for generating reference clocks in phase synchronous with said timing pattern read by said head;

a phase difference detector for outputting a phase difference signal indicating a phase difference between each of said reference clocks and a read pulse of said servo pattern read by said head;

a position signal generator for generating a head position signal indicating said position of said head from said phase difference signal from said phase difference detector; and a control circuit for detecting said marker pattern from an output of said head to control operations of said phase difference detector and said phase-lock loop circuit, and stopping a synchronous operation of said reference clocks when said marker pattern is detected.

12. The head position detecting apparatus according to claim 11, wherein a guard band/index area having guard band data and index data recorded therein is provided between said marker area and said servo area on said recording disk; and said control circuit detects said guard band data and said index data from said output of said head in accordance with detection of said marker pattern.

13. The head position detecting apparatus according to claim 12, wherein said control circuit detects said guard band data and said index data, with a position of magnetism inversion on said recording disk from a specific cycle taken as "0" and a shift of said position of magnetism inversion being taken as "1".

14. The head position detecting apparatus according to claim 11, wherein said position signal generator is an integrator for integrating said phase difference signal in accordance with detection of said marker data.

15. The head position detecting apparatus according to claim 14, wherein an analog-to-digital converter is further provided to convert an analog voltage of said integrator into a digital value; and said control circuit performs such control as to allow said analog-to-digital converter to perform analog-to-digital conversion after said phase difference signal is integrated by said integrator based on said servo data, and then to discharge said integrator.

16. The head position detecting apparatus according to claim 11, further comprising a cylinder selector for selecting that reference clock which has a phase corresponding to a target cylinder from those reference clocks generated by said phase-lock loop circuit.

17. A apparatus for detecting a head position by reading servo data from a recording medium having a plurality of tracks, said servo data being recorded on each said track and including at least a position pattern having different phases between the adjacent tracks, said apparatus comprising:

a clock generator for generating reference clocks of a plurality of different phases corresponding to said tracks;

a track selector for selecting that reference clock which corresponds to a target track from among said plurality of reference clocks of different phases;

a phase difference detector for generating a phase difference signal corresponding to a phase difference between said selected reference clock and a read pulse of said servo data; and a position signal generator for generating a head position signal indicating said position of said head from said phase difference signal from said phase difference detector.

18. The head position detecting apparatus according to claim 17, wherein said position signal generator has an integrator for integrating said phase difference signal.

19. The head position detecting apparatus according to claim 18, further comprising a control circuit for discharging said integrator after integrating said phase difference signal based on said servo data.

20. An apparatus for detecting a head position by reading servo data from a recording medium having a plurality of tracks, said servo data being recorded on each said track and including at least a position pattern having different phases between the adjacent tracks, wherein said servo data recorded on said recording medium has a first field having a phase shift, a second field having an opposite phase shift and a third field having said first phase shift, said apparatus comprising:

a clock generator for generating a reference clock;

a phase difference detector for generating a phase difference signal corresponding to a phase difference between said reference clock and a read pulse of said servo data, said phase difference signal being a duty pulse having a pulse width which indicates said phase difference between said reference clock in each of said fields and said read pulse;

an integrator for integrating said phase difference signal from said phase difference detector to generate a head position signal indicating said position of said head, said integrator having an integration capacitor, a first switching circuit for allowing a current to flow to said integration capacitor in one direction in response to said duty pulses of said first and third fields, and a second switching circuit for allowing a current to flow to said integration capacitor in the other direction in response to said duty pulses of said second field, said integrator further having two transistors connected to both ends of said integration capacitor, two sets of first current switches for driving said transistors, two sets of second current switches connected to both ends of said integration capacitor, and four constant current circuits respectively connected to said first and second current switches;

an analog-to-digital converter for converting an output of said integrator into a digital value; and a control circuit for causing said analog-to-digital converter to perform analog-to-digital conversion of an integration amount of said integrator after completing said integration of said phase difference signal by said integrator, and discharging said integrator after said analog-to-digital conversion.

21. The head position detecting apparatus according to claim 20, wherein said integrator further has a first power source for said transistors and said second current switches, and a second power source for said first current switches.

22. The head position detecting apparatus according to claim 21, wherein said second power source of said integrator comprises said first power source and a constant current circuit.

23. The head position detecting apparatus according to claim 20, wherein said integrator has a common basic circuit for giving a reference voltage to said constant current circuits connected to said current switches.

24. The head position detecting apparatus according to claim 20, wherein said integrator has a pair of first operational amplifiers of a voltage-follower type for receiving a voltage at both ends of said integration capacitor, and a second operational amplifier for obtaining a difference between outputs of said pair of first operational amplifiers.

25. An apparatus for detecting a head position by reading servo data from a recording medium having a plurality of tracks, said servo data being recorded on each said track and including at least a position pattern having different phases between the adjacent tracks, said apparatus comprising:

a clock generator for generating a reference clock;

a phase difference detector for generating a phase difference signal corresponding to a phase difference between said reference clock and a read pulse of said servo data, said phase difference detector having a flip-flop to be set at rising of said reference clock, another flip-flop to be set at rising of said read pulse, and an exclusive OR gate for obtaining an exclusive OR of outputs of said flip-flops and outputting said phase difference signal;

an integrator for integrating said phase difference signal from said phase difference detector to generate a head position signal indicating said position of said head;

an analog-to-digital converter for converting an output of said integrator into a digital value; and a control circuit for causing said analog-to-digital converter to perform analog-to-digital conversion of an integration amount of said integrator after completing said integration of said phase difference signal by said integrator, and discharging said integrator after said analog-to-digital conversion.

* * * * *

UNITED STATES PATENT AND TRADEMARK OFFICE
CERTIFICATE OF CORRECTION

PATENT NO. : 5,523,900
DATED : June 4, 1996
INVENTOR(S) : Kosugi et al.

It is certified that error appears in the above-indentified patent and that said Letters Patent is hereby corrected as shown below:

Column 3, line 30, delete "on said" and insert --on--

Column 6, line 64, delete "using that" and insert --using those--

Column 10, line 18, delete "sync ronized" and insert --synchronized--

Column 10, line 19, delete "sync ronized" and insert --synchronized--

Column 10, line 60, delete "CARO" and insert --CARØ--

Column 11, line 63, delete "BAH" and insert --SAH--

Column 14, line 1, delete "4B" and insert --43--

UNITED STATES PATENT AND TRADEMARK OFFICE
CERTIFICATE OF CORRECTION

PATENT NO. : 5,523,900
DATED : June 4, 1996
INVENTOR(S) : Kosugi et al.

It is certified that error appears in the above-indentified patent and that said Letters Patent is hereby corrected as shown below:

Column 15, line 42, delete "B4" and insert --34--

Column 16, line 14, delete "2BA" and insert --23A--

Signed and Sealed this

Twenty-ninth Day of July, 1997

Attest:

BRUCE LEHMAN

*Attesting Officer*  *Commissioner of Patents and Trademarks*